United States Patent [19]
Gulliver et al.

[11] Patent Number: 5,476,304
[45] Date of Patent: Dec. 19, 1995

[54] ADJUSTING MECHANISM FOR A CHAIR-MOUNTED COMPUTER INPUT DEVICE

[75] Inventors: Barron J. Gulliver, Sturgis, Mich.; Clarence G. Machlan, Elkhart, Ind.

[73] Assignee: Chrysalis Incorporated, Elkhart, Ind.

[21] Appl. No.: 150,399

[22] Filed: Nov. 10, 1993

Related U.S. Application Data

[63] Continuation-in-part of Ser. No. 790,596, Nov. 7, 1991, Pat. No. 5,275,465.

[51] Int. Cl.$^6$ .................................................. A47C 7/62
[52] U.S. Cl. .................. 297/173; 248/284.1; 297/411.33
[58] Field of Search .................................. 297/135, 144, 297/145, 154, 155, 173, 411.32, 411.33, 411.35, 411.37, 411.38; 248/278, 279, 284, 287

[56] References Cited

U.S. PATENT DOCUMENTS

| | | |
|---|---|---|
| 2,829,920 | 4/1956 | Cohen . |
| 3,041,034 | 6/1962 | Wilkinson .............................. 248/284 |
| 4,277,102 | 7/1981 | Aaras et al. . |
| 4,455,008 | 6/1984 | MacLew . |
| 4,682,749 | 7/1987 | Shrater .................................... 248/284 |
| 4,828,323 | 5/1989 | Brodersen et al. ................. 248/284 X |
| 5,029,941 | 7/1991 | Twisselmann ...................... 297/411.33 |
| 5,143,422 | 9/1992 | Althofer et al. . |
| 5,275,465 | 1/1994 | Gulliver et al. . |
| 5,301,999 | 4/1994 | Thompson et al. ...................... 248/284 |

FOREIGN PATENT DOCUMENTS

| | | |
|---|---|---|
| 2419637 | 11/1974 | Germany ................................ 248/278 |
| 2042056 | 2/1979 | United Kingdom . |
| 86/03167 | 6/1986 | WIPO . |

*Primary Examiner*—Peter R. Brown
*Attorney, Agent, or Firm*—Renner, Kenner, Greive, Bobak, Taylor & Weber

[57] ABSTRACT

An adjusting assembly for mounting a supporting tray assembly to a chair using one or more arm assemblies. The proximal end portion of a mounting bar is secured to a chair such that the mounting bar is disposed substantially horizontally. A substantially vertically disposed support assembly is mounted from the distal end portion of the mounting bar, and the support assembly may be rotatable about a vertical axis, if desired, to facilitate entering and exiting the chair. If only one arm assembly is used, the first end portion of an arm assembly is supported for articulation from the pivot assembly, and a tray assembly is pivotally supported from the second end portion of the arm assembly. If two or more arm assemblies are utilized, each arm assembly has a housing with first and second end portions. One end portion of one arm assembly is supported from a chair for articulation about a first articulating axis, and a tray assembly is pivotally supported from one end portion of another arm assembly for movement about a pivotal axis. The other end portions of the arm assemblies are interconnected for relative articulation about one or more intermediate axes. Locking means operatively interact with the arm assemblies to secure: (1) the selected position of the articulating arm assemblies about the first articulating axis, (2) the selected pivotal position of the tray assembly about its pivotal axis; and, (3) the selected articulation of the arm assemblies with respect to each other about the intermediate articulating axes.

16 Claims, 23 Drawing Sheets

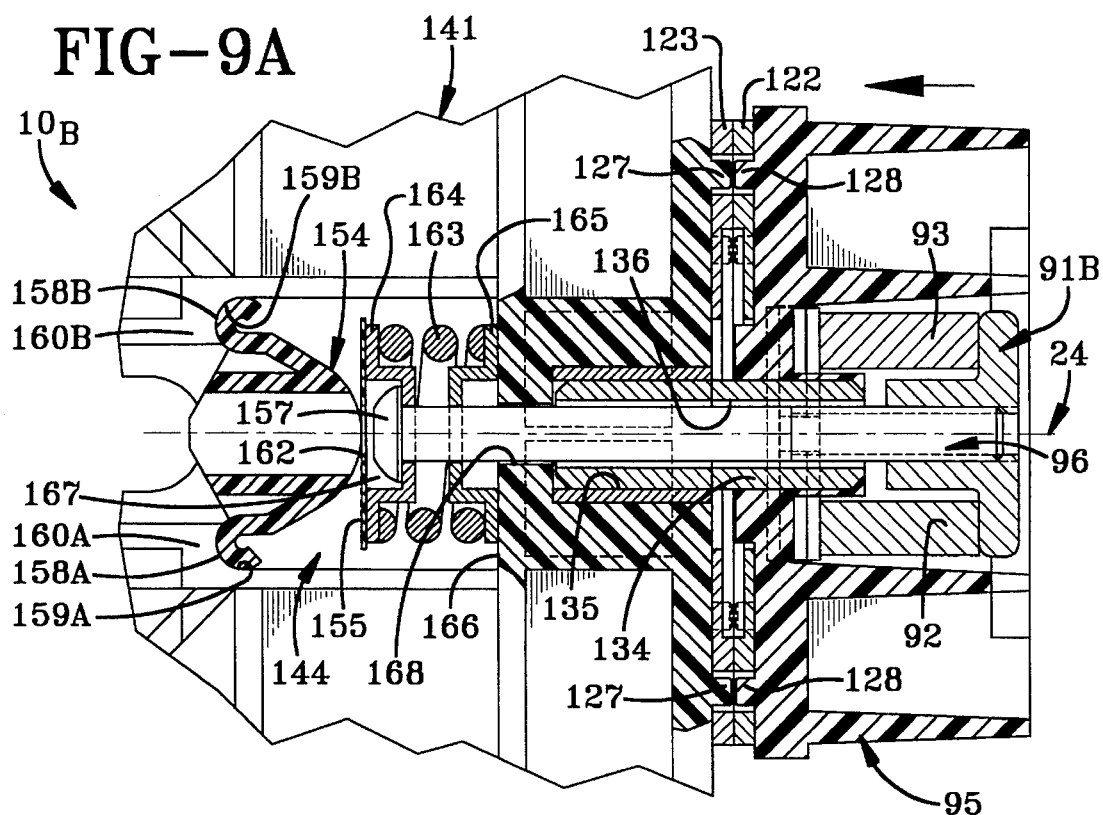
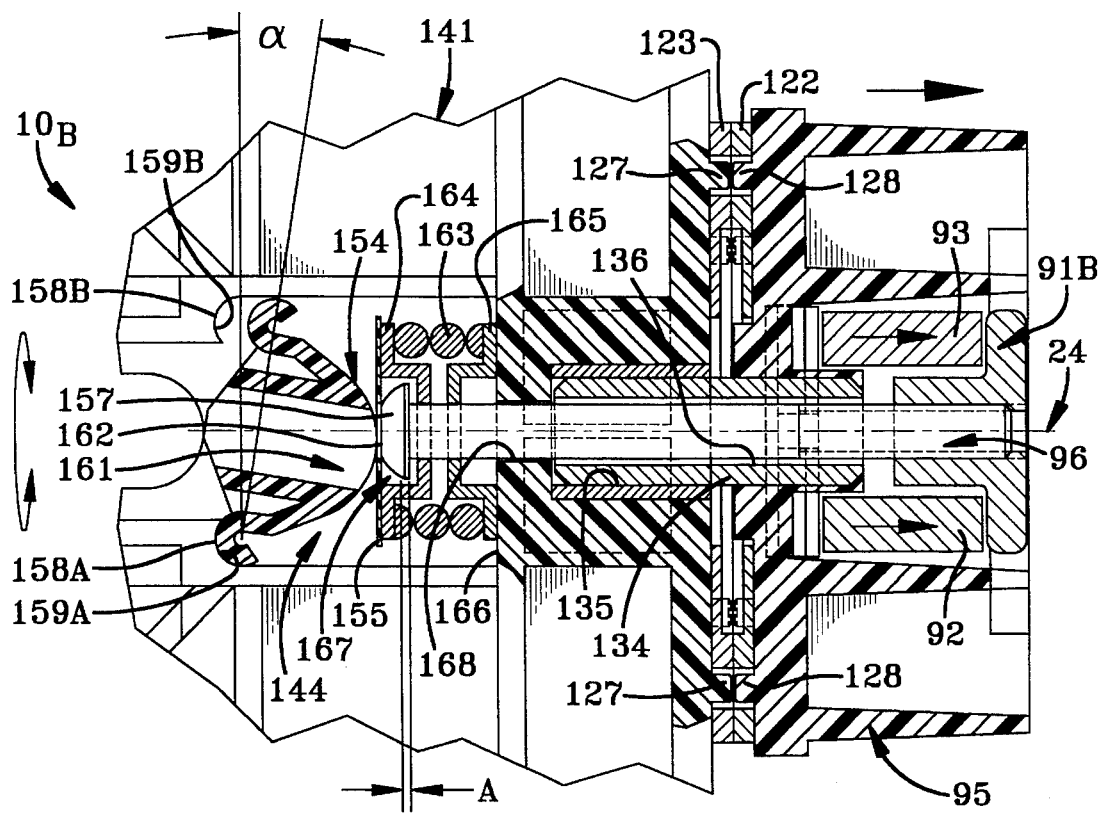

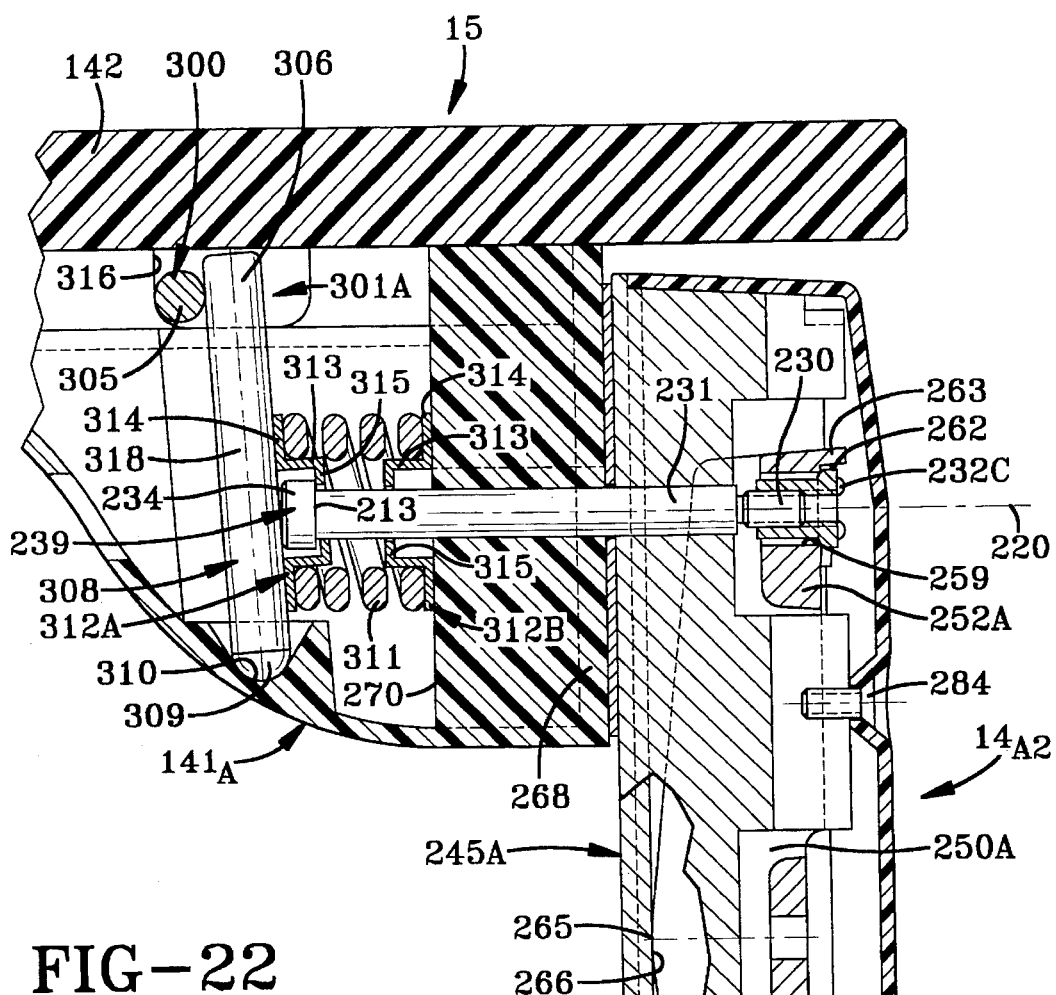
FIG-22
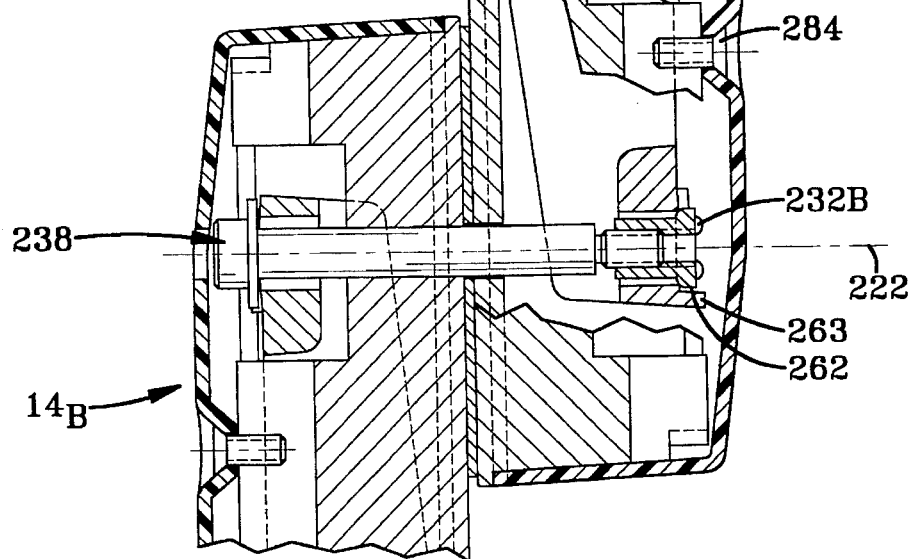

ADJUSTING MECHANISM FOR A CHAIR-MOUNTED COMPUTER INPUT DEVICE

The subject application is a continuation-in-part of U.S. application, Ser. No. 07/790,596, filed on Nov. 7, 1991, in the names of Barron J. Gulliver and Clarence G. Machlan, which application issued on Jan. 4, 1994, as U.S. Pat. No. 5,275,465.

TECHNICAL FIELD

The present invention relates generally to computer work station furniture. More particularly, the present invention relates to a chair-mounted tray assembly by which to support a computer input device. Specifically, the present invention relates to an adjusting mechanism by which to select the disposition of the tray assembly relative to the chair from which it is mounted for the maximum convenience of the person seated in the chair.

BACKGROUND OF THE INVENTION

Heretofore, the furniture available for computer operators provided for independent adjustments of the computer monitors and input devices relative to the desks on, or from, which they were supported. The chair at a work station could, of course, be adjusted independently of, and therefore relative to, the desk on which the computer equipment was supported. Nevertheless, it must be appreciated that no matter how many individual adjustments were provided, such arrangements effectively immobilize the operator while operating the computer. That is, the proper "registration" of the operator's hands with respect to the computer input device can be maintained only so long as the chair on which the operator is seated does not move relative to the independent desk, or other structural arrangement, from which the input device is supported. Inasmuch as the aforesaid registration of the computer operator relative to the computer, and particularly the input device, is accomplished by independently positioning not only the computer components relative to their supporting devices but also the chair relative to the supporting devices for the computer components, the computer operator can not rock or swivel in the chair while working without varying the particular registration desired by that particular operator. And yet, frequent movement of the operator is highly desirable. It has been found that movement of the operator enhances circulation and reduces the strain, tension and muscle cramping so often experienced when operating computers for long periods of time. Immobility, on the other hand, leads to physical discomfort, and occasional disability.

SUMMARY OF THE INVENTION

It is, therefore, a primary object of the present invention to provide an arrangement whereby the computer input device is supported directly from the chair in which the computer operator sits in order to assure registration between the computer operator and at least the computer input device, irrespective of how much the operator may move, rock or swivel, in the chair.

It is another object of the present invention to provide a mechanism by which to adjust a chair-mounted tray assembly upon which a computer input device may be supported.

It is a further object of the present invention to provide an adjusting mechanism, as above, which permits the tray assembly to be selectively disposed fore and aft with respect to the operator by movement of the tray assembly about one or more articulating axes.

It is a still further object of the present invention to provide an adjusting mechanism, as above, which permits the tray to be selectively tilted about a pivotal axis that is displaced from the articulating axis.

It is yet another object of the present invention to provide an adjusting mechanism, as above, variations of which may permit the articulating axis to be selectively displaced in a vertical direction.

It is an even further object of the present invention to provide an adjusting mechanism, as above, variations of which may permit selective adjustments without the need for manipulating a locking actuator.

It is a still further object of the present invention to provide an adjusting mechanism, as above, variations of which may permit selective adjustments by operating a single locking actuator.

These and other objects of the invention, as well as the advantages thereof over existing and prior art forms, which will be apparent in view of the following detailed specification, are accomplished by means hereinafter described and claimed.

In general, an adjusting assembly for mounting a supporting tray assembly to a chair in accordance with the concepts of the present invention utilizes one or more arm assemblies. The proximal end portion of a mounting bar is secured to a chair such that the mounting bar is disposed substantially horizontally. If only one arm assembly is utilized, a substantially vertically disposed support assembly is mounted from the distal end portion of the mounting bar for vertical adjustment, and the support assembly may be rotatable about a vertical axis, if desired, to facilitate entering and exiting the chair. The first end portion of an arm assembly is supported for articulation from the pivot assembly, and a tray assembly is pivotally supported from the second end portion of the arm assembly.

If two or more arm assemblies are utilized, each arm assembly has a housing with first and second end portions. One end portion of one arm assembly is supported from a chair for articulation about a first articulating axis, and a tray assembly is pivotally supported from one end portion of another arm assembly for movement about a pivotal axis. The other end portions of the arm assemblies are interconnected for relative articulation about one or more intermediate axes.

A rocker lever may be received within each housing. The rocker lever has first and second input/reaction connector locations and an output connector location, the three connector locations being spaced along the rocker lever. One of the input/reaction connector locations serves as a pivot point that is located medially of the other said input/reaction connector location and the output connector location.

Locking means operatively interact with at least one of the input/reaction connector locations simultaneously to secure: (1) the selected position of the articulating arm assemblies about the first articulating axis, (2) the selected pivotal position of the tray assembly about its pivotal axis; and, (3) the selected articulation of the arm assemblies with respect to each other about the intermediate articulating axes in order to maintain the desired pivotal disposition of the tray assembly as well as the selected vertical distance between the chair and the tray assembly.

In short, an adjusting mechanism embodying the concepts of the present invention is incorporated in the structure by which a tray assembly is mounted from a chair. A substantially vertically disposed support assembly may be mounted from the distal end portion of the mounting bar, and the support assembly may be rotatable about a vertical axis, if desired, to facilitate entering and exiting the chair. The support assembly also permits selective vertical, as well as pivotal, adjustment of the tray assembly.

To acquaint persons skilled in the arts most closely related to the present invention, several embodiments of an adjusting assembly for mounting a supporting tray assembly to a chair that illustrate the best modes now contemplated for putting the invention into practice are described herein by, and with reference to, the annexed drawings that form a part of the specification. The exemplary adjusting assembly is described in detail without attempting to show all of the various forms and modification in which the invention might be embodied. As such, the embodiments shown and described herein are illustrative, and as will become apparent to those skilled in these arts can be modified in numerous ways within the spirit and scope of the invention; the invention being measured by the appended claims and not by the details of the specification.

BRIEF DESCRIPTION OF THE DRAWINGS

FIG. 9A is an enlarged, horizontal section taken substantially along the reference line 9—9 in FIG. 8 but with the release actuator received within an appropriate recess in the frame of the tray assembly and with the interrelated structural components having been assembled to represent their disposition with the locking mechanism in the engaged mode;

FIG. 9B is a view similar to FIG. 9A but with the release actuator having been swung by the lever to depict the disposition of the locking mechanism in the release mode;

Figure 17:
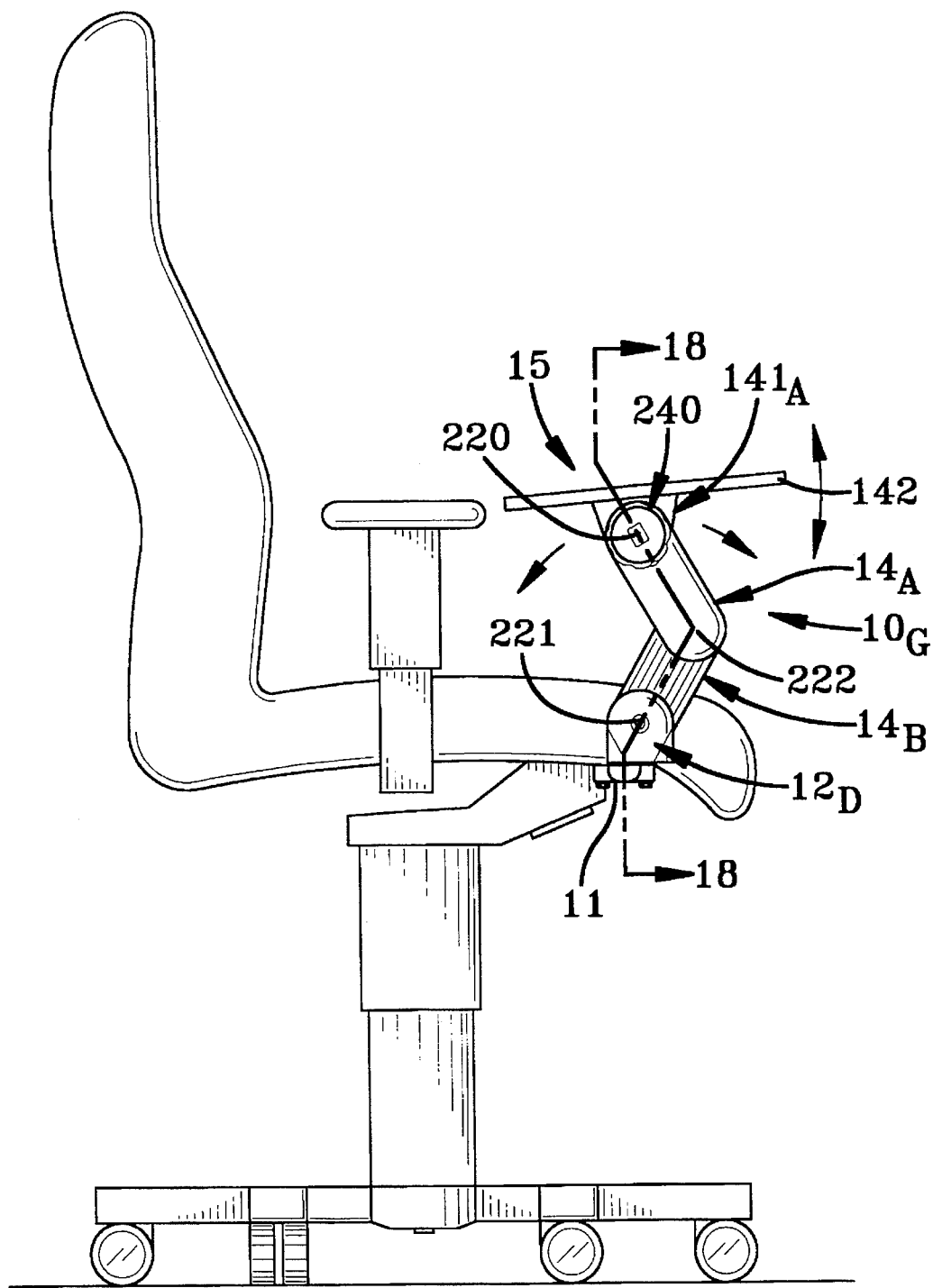
FIG. 17 is a side elevation, similar to FIG. 1, but enlarged, of yet another embodiment of an adjusting mechanism for supporting a tray assembly from a chair, this embodiment utilizing at least two arm assemblies.
Figure 18A:
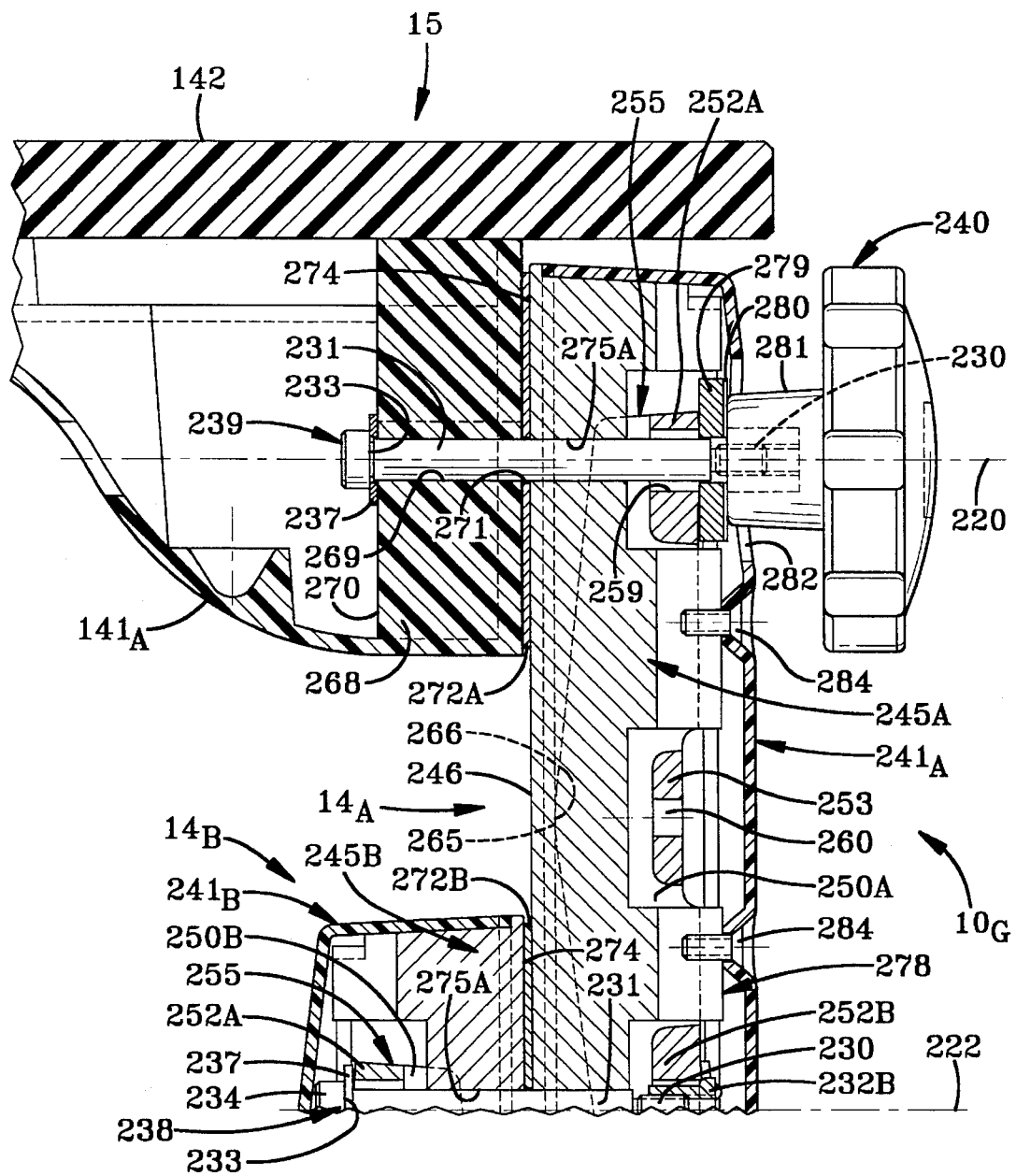
FIG. 18A is an enlarged, vertical section taken substantially along a portion of line 18—18 on FIG. 17, FIG. 18A depicting the interrelationship between the structure of one arm assembly to the structure of the tray assembly, the interrelationship between the structure of the arm assembly from which the tray assembly is mounted to a partial representation of the arm assembly that is attached to the support assembly and with particular emphasis on one form an actuating means by which to operate the adjustment mechanism.
Figure 18B:
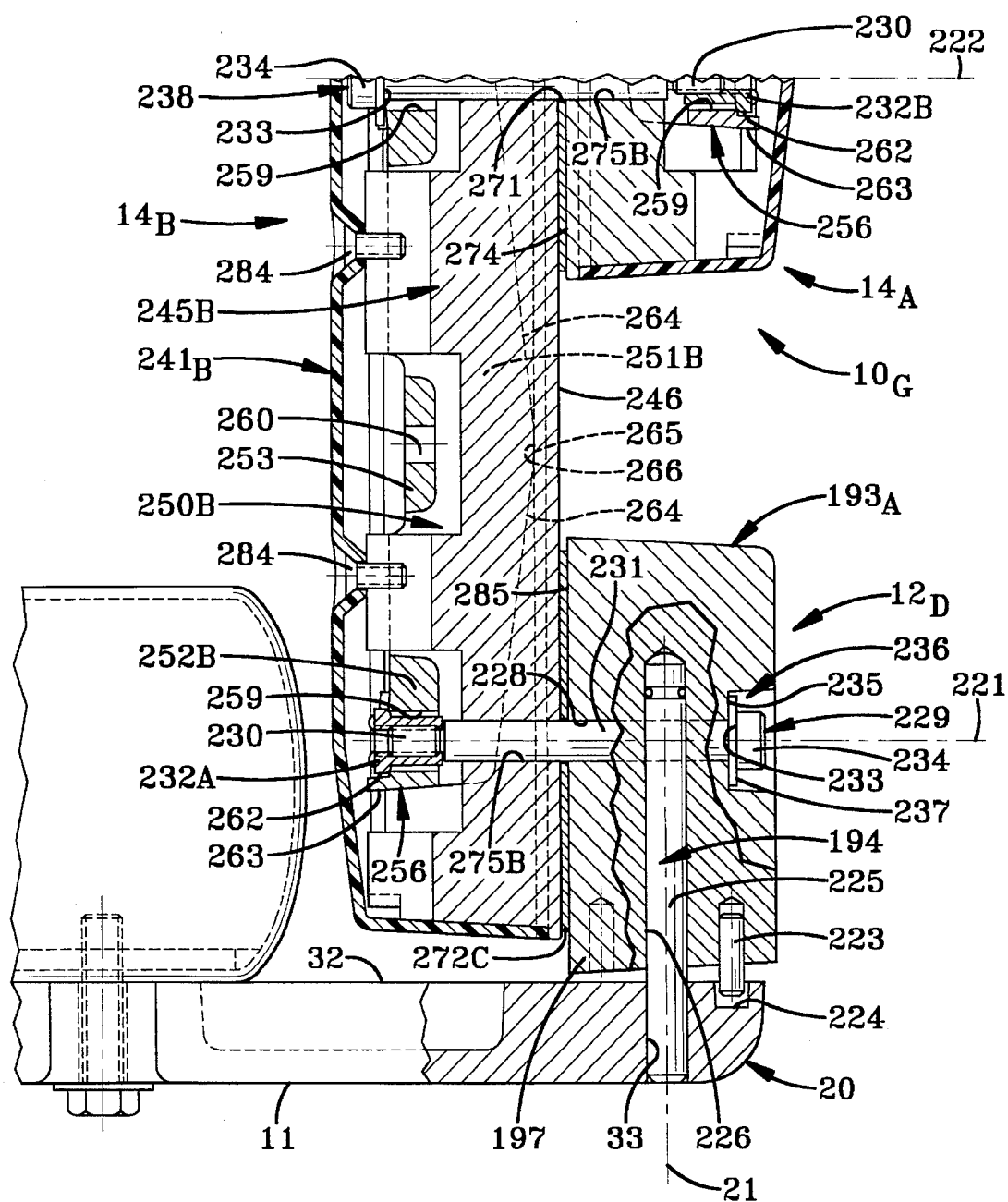
FIG. 18B is an enlarged, vertical section, similar to FIG.
Figure 19:
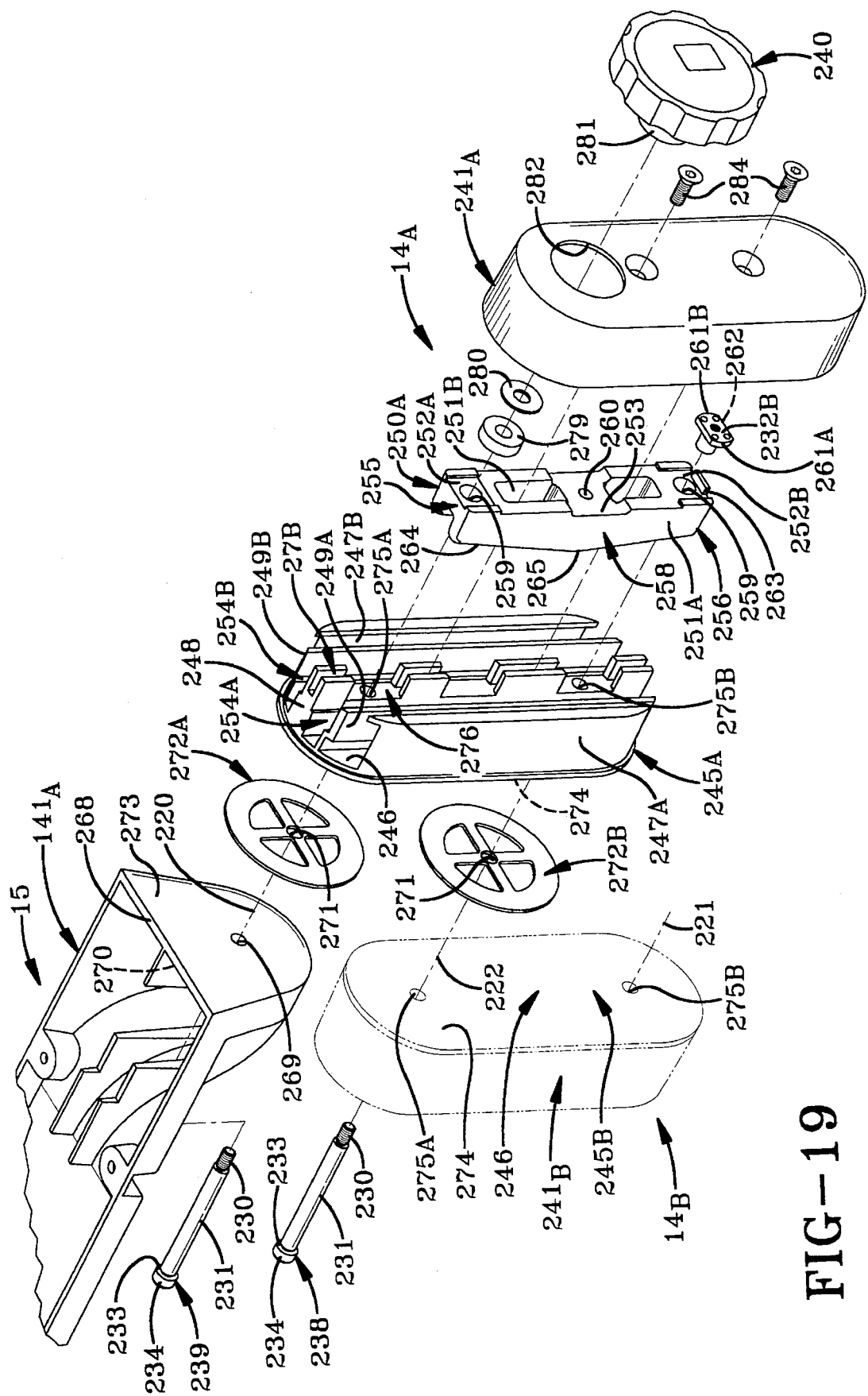
Figure 20:
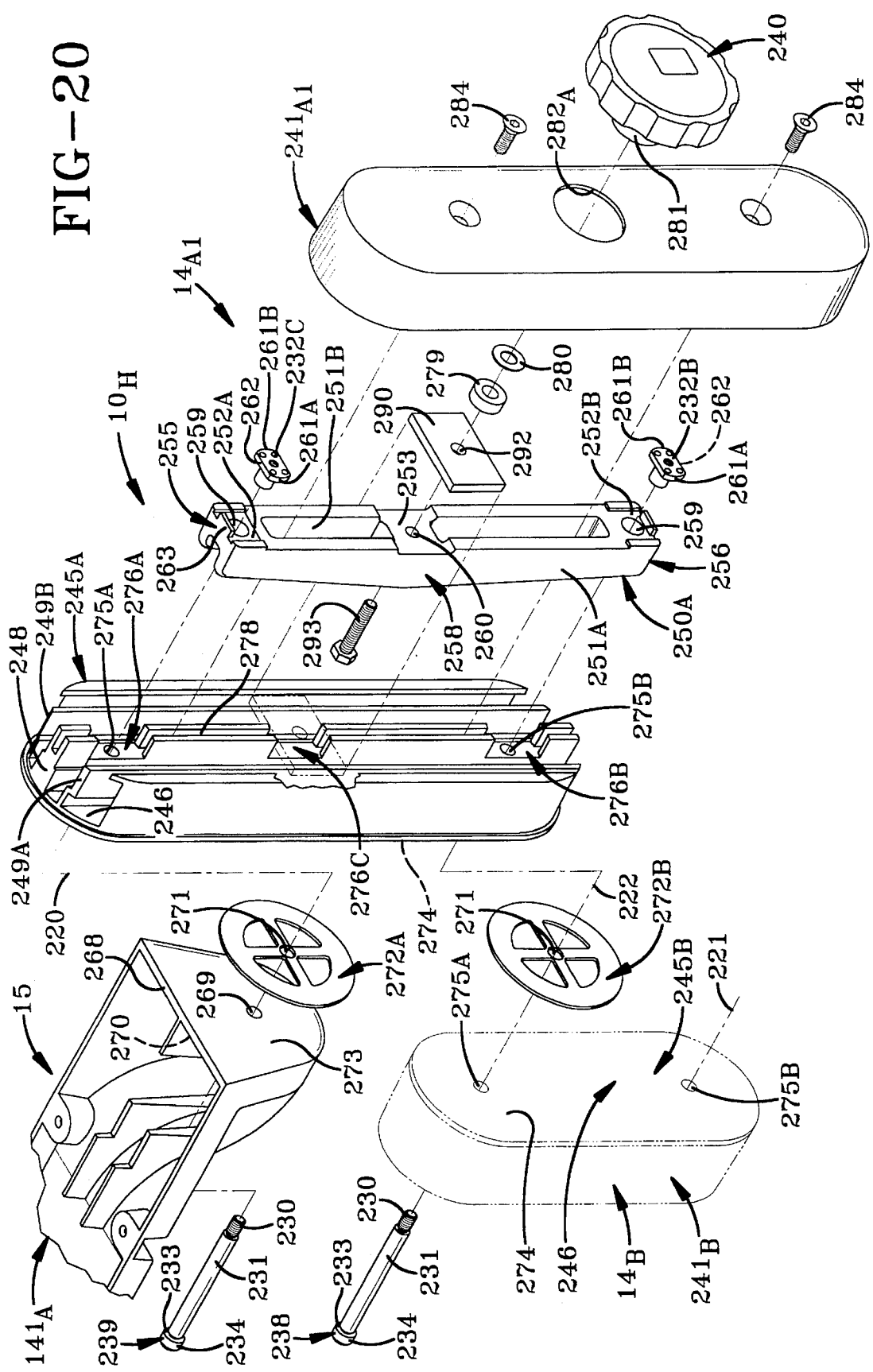

18A and taken substantially along a portion of line 18—18 of FIG. 17, FIG. 18B depicting the interrelationship between the structure of a second arm assembly to the structure of the support assembly and the interrelationship between the structure of the arm assembly mounted on the support assembly to a partial representation of the arm assembly from which the tray assembly is mounted;

FIG. 19 is an exploded perspective, reduced in size, of the arm assembly from which the tray assembly is mounted to focus on the actuating means incorporated in the embodiment depicted in FIGS. 17 and 18A;

FIG. 20 is an exploded perspective similar to FIG. 19, but depicting a further variation for an actuating means that may be employed with the embodiment of the arm assemblies depicted in FIGS. 17 and 18A.

Figure 21:
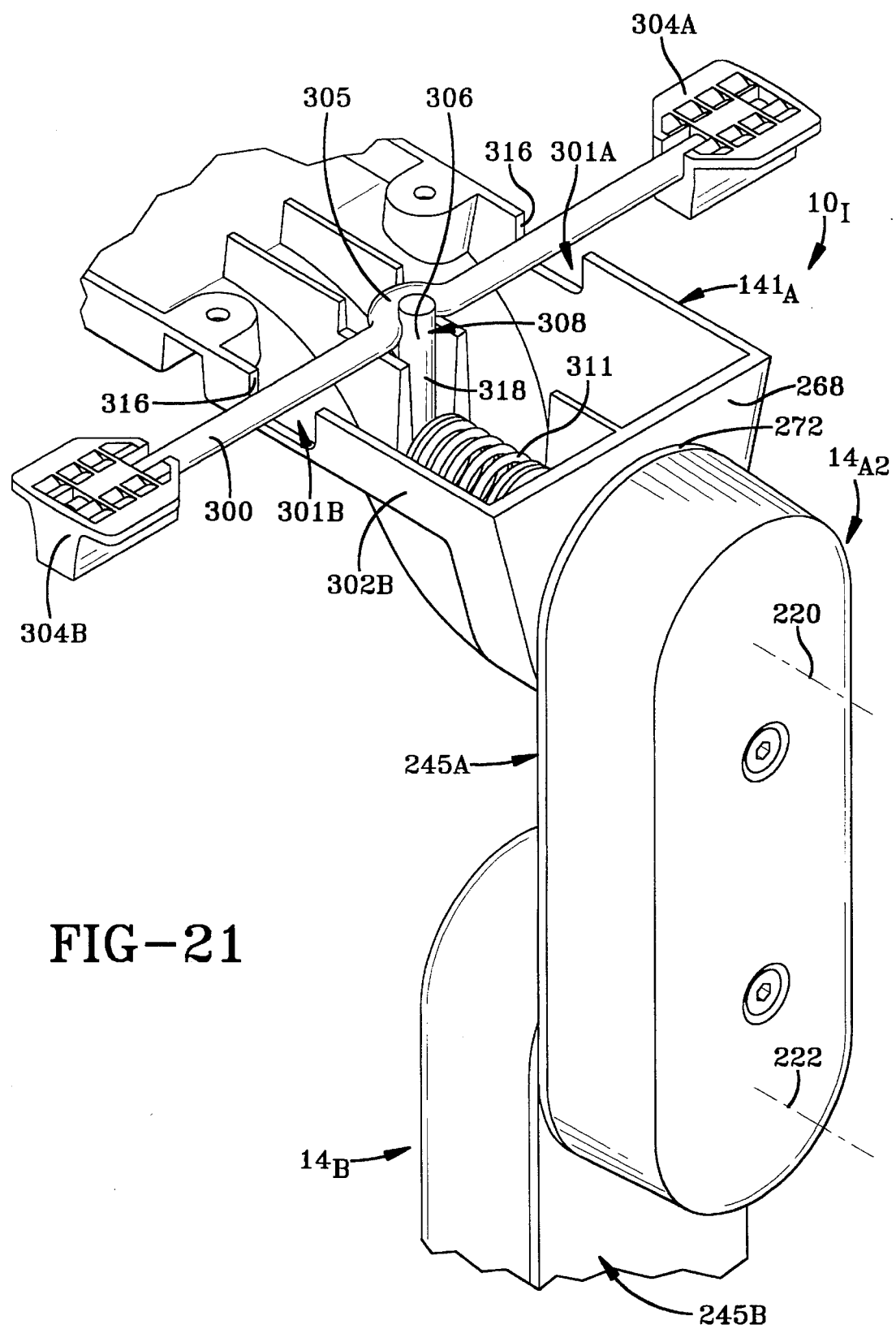
Figure 23:
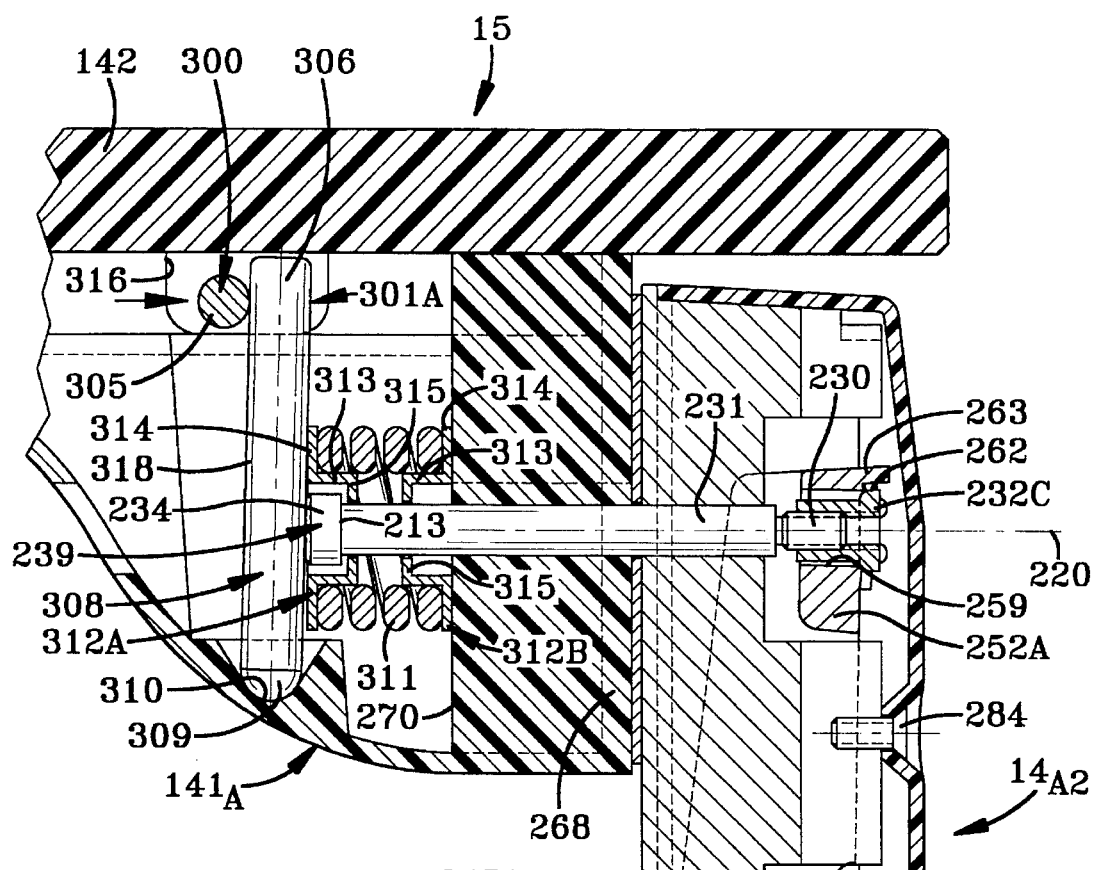

FIG. 21 is a perspective view of a still further variation of the actuating means by which to operate the adjusting mechanism;

FIG. 22 is a view similar to FIG. 18A, but depicting a variation of the actuating means by which to operate the adjusting mechanism, the actuating means being disposed to secure the tray assembly in position; and, FIG. 23 is a view similar to FIG. 22 but with the actuating means disengaged to permit adjustment of the tray assembly with respect to not only the pivotal axis but also the first and intermediate articulation axes.

DESCRIPTION OF AN EXEMPLARY EMBODIMENT

Representative forms of an adjusting mechanism for a chair-mounted arrangement by which to support at least the input device for a computer are designated generally by the numeral 10 on the accompanying drawings. One form of an exemplary adjusting mechanism, identified by the alphanumeric designation $10_A$ and as detailed in FIGS. 3 through 10, includes a mounting bar 11, a vertical support assembly 12, an arm assembly 14, and a tray assembly 15. The proximal end portion 16 (FIG. 3) of the mounting bar 11 is secured to the underside 17 of a chair seating frame 18 (FIG. 1), and the distal end portion 20 of the mounting bar 11 defines a vertically extending, rotational axis 21 (FIG. 3) with respect to which the vertically disposed support assembly 12 is rotatably supported. The support assembly 12 presents a substantially horizontal articulation adjustment axis 22 with respect to which the arm assembly 14 is mounted for articulation. The arm assembly 14 also presents a substantially horizontal pivot axis 24 about which the tray assembly 15 may be adjustably tilted. In addition, supporting assembly $12_A$ incorporates means by which the articulation adjustment axis 22, and therefore the horizontal pivot axis 24, can be vertically adjusted.

The present invention is disclosed in conjunction with a number of variations. As such, in the detailed description which follows, a particular structural member, component or arrangement may be employed in more than one variation of the adjusting mechanism, or even at more than one location in a particular variation of the adjusting mechanism. When referring generally to that type of structural member, component or arrangement a common numerical designation shall generally be employed in each of the several variations described herein. However, when one of the structural members, components or arrangements so identified is employed at more than one location in a single variation, and that component is to be individually identified, it shall be referenced by virtue of a letter suffix employed in combination with the numerical designation employed for general identification of that structural member, component or arrangement. As an example of this usage two keyways shall be subsequently identified on one variation, and those keyways will have the same structure. As such, the keyways shall be generically identified by the numeral 85, but the specific keyways shall be individually identified as 85A and 85B, both in the specification and on the drawings. There are also two structural variations of the vertical support assembly which shall be generally identified by the number 12. However, the two specific configurations of that component shall be identified by a letter suffix which shall be represented as a subscript. Accordingly, the specific, individual variations of the support assemblies shall be identified as $12_A$ and $12_B$, both in the specification and on the drawings. This same suffix convention shall be employed throughout the specification.

Figure 1:
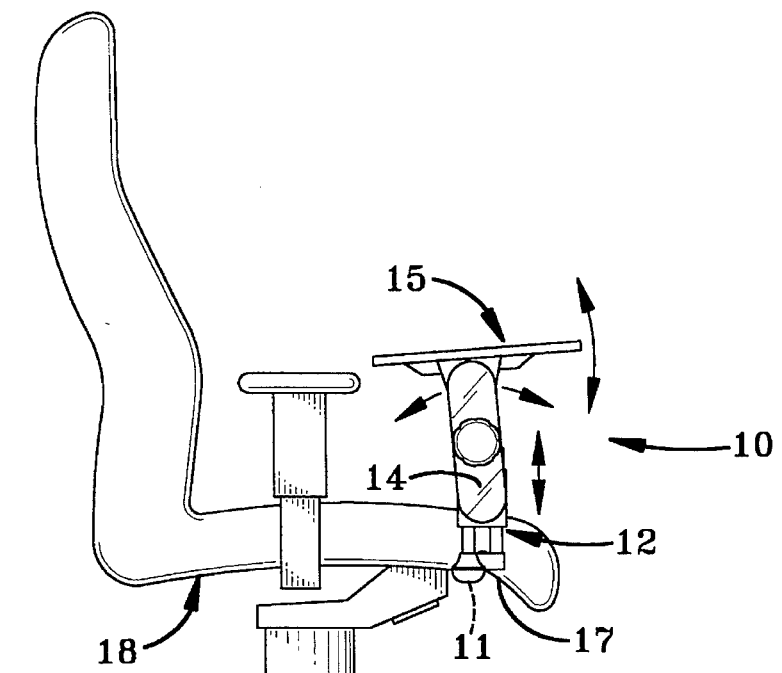
FIG. 1 is a side elevation of a chair with a supporting tray assembly mounted thereon by an adjusting mechanism which incorporates the concepts of the present invention.

With particular reference to the primary embodiment, which is presented in detail in FIGS. 3 through 7, the mounting bar 11 is depicted as having a pair of mounting bores 26 and 27 through which a pair of fasteners 28 and 29, respectively, extend and by which the mounting bar may be secured to the underside 17 of the chair seating frame 18 (FIG. 1). The mounting bore 26 nearest the proximal end portion 16 of the mounting bar 11 may be laterally elongated to permit some adjustment to the precise orientation of the mounting bar 11 on the chair seating frame 18. The distal end portion 20 of the mounting bar 11 terminates in a bulbous portion 31 which presents an upwardly facing substantially flat surface 32 having a substantially central, circular opening 33 through which the rotary axis 21 extends.

A guide bar, or support rod, 34 is received in the circular opening 33 and extends vertically upwardly from the mounting bar 11. Preferably, the lower end 35 of the guide bar 34 is fixedly secured within the opening 33 in order to provide a structural arrangement by which the remaining components carried by the mounting bar 11 may be provided with laterally stability. A first guide tube 36 surrounds the guide bar 34, is freely rotatable thereon, and has a lower end 37 that is secured in a lower tube retainer 38. The upper end 40 of the first guide tube 36 is fitted in an upper tube retainer 41 which may be rotatably secured to the guide bar 34 by a threaded fastener 44. A second guide tube 42 is also secured, at its respective upper and lower ends 45 and 46, in the upper tube retainer 41 and the lower tube retainer 38. The lower tube retainer 38 has an enlarged portion 48 which surrounds the lower end 37 of the first guide tube 36. Extending laterally outwardly from the enlarged portion 48 is an elongated portion 49 which terminates in a rounded end portion 51. An opening 52 penetrates the rounded end portion 51, and the lower end 46 of the guide tube 42 is received in the opening 52. A thrust washer 54 is disposed between the lower tube retainer 38 and the upwardly facing surface 32 on the mounting bar 11. The thrust washer 54 provides a low friction interface between the vertical support assembly $12_A$ and the mounting bar 11 to facilitate positioning of the support assembly $12_A$ relative to the mounting bar 11, and about the vertically oriented, rotational axis 21.

A conventional detent assembly 57 may be mounted in a receiving bore 59 provided in the elongated portion 49 of the lower tube retainer 38. The detent assembly 57 includes a conventional, spring-biased ball member 58 which cooperates with recesses 60A and 61A incorporated in the upwardly facing surface 32 on the bulbous portion 31 of the mounting bar 11 to establish the two limit positions between which the vertical support assembly $12_A$ may be rotated. A track 62A extends between the recesses 60A and 61A to guide the ball member 58 during rotation of the support assembly $12_A$ between the two limit positions. A second pair of recesses 60B and 61B as well as a track 62B are provided in the upwardly facing surface 32 for providing positioning of the vertical support assembly $12_A$ when the mounting bar 11 is secured in the opposite direction on the underside 17 of the chair seating frame 18. Thus, the same mounting bar 11 may be used to accommodate both left and right hand configurations irrespective of whether desired with respect to the manufacture of original equipment or for "in-field" conversions, thereby reducing the number of components required in inventory.

A vertical adjustment assembly 64 is mounted on the guide tubes 36 and 42. The vertical adjustment assembly includes opposed first and second slide blocks 65 and 66 secured together by threaded fasteners 67 and 68 and their associated nuts 69 and 70. The hex nuts 69 and 70 are received in hexagonal openings 72 and 73, respectively, formed in the second slide block 66, and the fasteners 67 and 68 pass through cylindrical openings 74 and 75, respectively, which penetrate the first slide block 65 operatively to engage the nuts 69 and 70. The first slide block 65 has a plurality of central flat surfaces 77 presented on either side of the openings 74 and 75 as well as flat outer edges 78 and 79. The second slide block 66 has mirror image surfaces and edges which cooperate with the surfaces 77 and the edges 78 and 79 on the first slide block 65 to maintain the availability of a sliding fit between the slide blocks 65 and 66 and the guide tubes 36 and 42, even when the slide blocks 65 and 66 are conjoined by the fasteners 67 and 68.

The sliding fit between the assembled slide blocks 65 and 66 and the guide tubes 36 and 42 may, however, be selectively negated to permit one to move the assembled slide blocks to specific vertical locations along the guide tubes 36 and 42. Specifically, a lock block 81 is loosely received in a cavity 82 recessed in the first slide block 65 and is guided for translational movement therein by a pair of tangs 84A and 84B which cooperate with the respective keyways 85A and 85B formed in the first slide block 65. A first, threaded draw bolt 86, which is disposed concentrically of the articulation adjustment axis 22, passes through a central aperture 87 that penetrates the lock block 81. A pair of quarter-cylindrical lock surfaces 89 and 90 presented from the lock block 81 are disposed for frictionally locking engagement with the guide tubes 36 and 42, respectively. The first, threaded draw bolt 86 threadably engages a clamp actuator 91A which cooperates with a pair of clamp bars 92 and 93 received within the housing 95 of the arm assembly 14 to secure the position of the vertical support assembly $12_A$, and therefore the position of the articulation axis 22, in a manner to be hereinafter more fully described.

A second draw bolt 96 is employed to secure the tray assembly 15 to the arm assembly 14, as will also be hereinafter more fully described.

Figure 3:
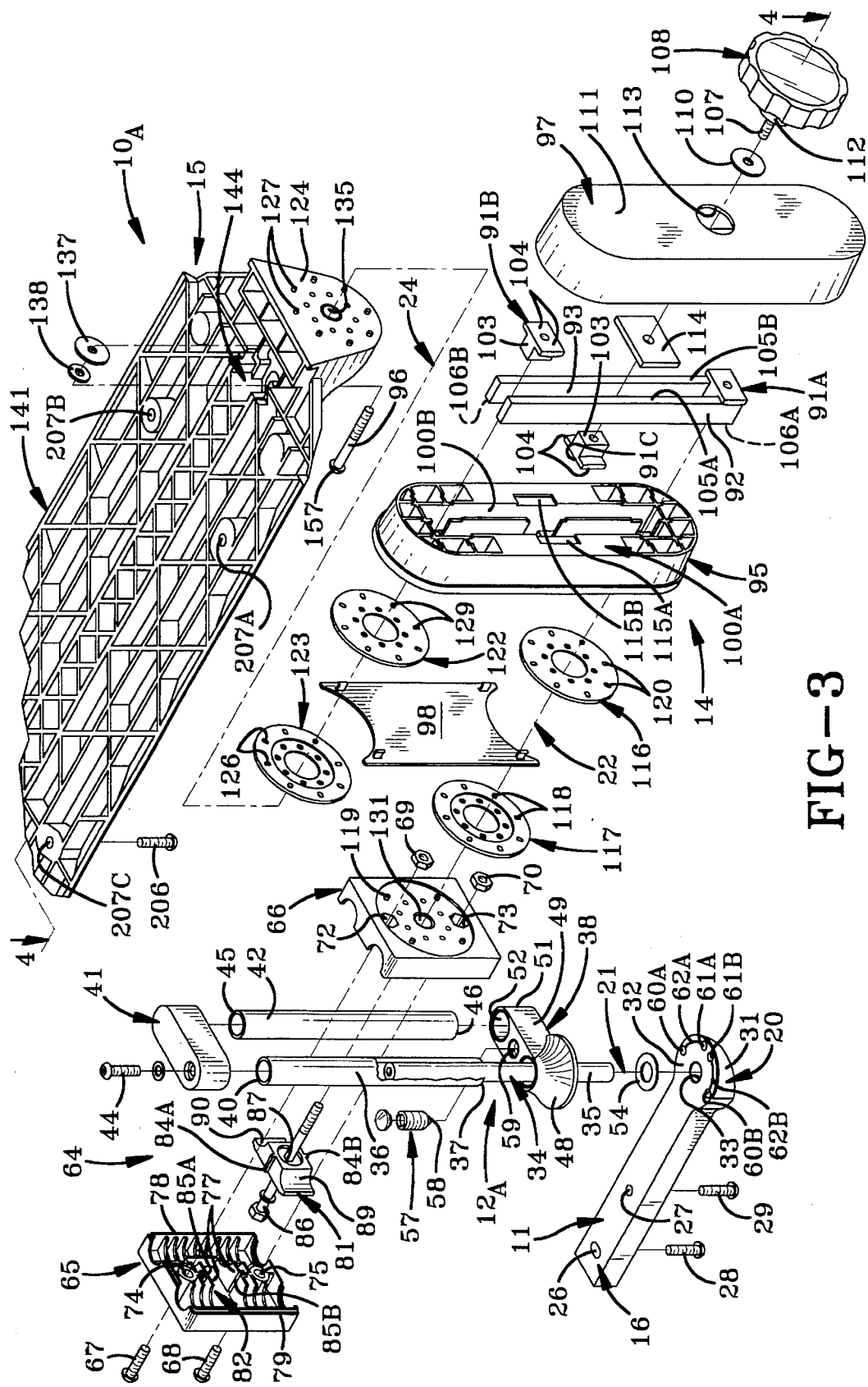
FIG. 3 is an exploded perspective depicting a mounting bar that is adapted to be substantially horizontally supported from the chair, a substantially vertically disposed support assembly that is rotatably supported from the mounting bar, an arm assembly that is supported for articulation from the support assembly and the frame portion of the tray assembly that is pivotally supported from the arm assembly—the adjustments in the three directions designated by the arrows in FIG. 1 being available by appropriate actuation to release or engage a locking mechanism with a single adjustment control knob.

In addition to the housing, or body, 95, the arm assembly 14 includes a cover 97 and a cover plate 98 that are received on opposite sides of the housing 95. The clamp bars 92 and 93 are disposed in rectangular recesses 100A and 100B provided in the housing 95, as best seen in FIG. 3.

A plurality of clamp actuators 91 are utilized in the present embodiment. Each clamp actuator 91 has a substantially T-shaped cross section with the center leg 103 of each being disposed between the clamp bars 92 and 93 and with the transverse cross piece 104 of each abutting an appropriate reaction surface on the clamp bars 92 and 93. Clamp actuators 91A and 91B position the transverse cross pieces 104 in abutment with the reaction surfaces which constitute the edges 105A and 105B of the respective clamp bars 92 and 93. Conversely, clamp actuator 91C has the transverse cross piece 104 disposed in abutment with the reaction surfaces which constitute the opposite edges 106A and 106B of the respective clamp bars 92 and 93. The center leg 103 of clamp actuator 91A cooperatively engages the first threaded draw bolt 86. The center leg 103 of clamp actuator 91B cooperatively engages the second threaded draw bolt 96, and the center leg 103 of the clamp actuator 91C cooperatively engages the threaded extension 107 of an adjustment control knob 108. The shank 112 of the adjustment control knob 108 passes through an aperture 113 in the outer surface 111 of the cover 97 to engage a generally rectangular thrust force distribution washer 114 which is supported across at least the recessed shelves 115A and 115B in the housing 95. A bearing washer 110 may be interposed between the shank 112 of the adjustment control knob 108 and the thrust force distribution washer 114 to reduce the frictional forces therebetween.

Because the thrust force distribution washer 114 abuts the supporting shelves 115 recessed into the housing 95, rotation of the adjustment control knob 108 in a tightening direction will drive the transverse cross piece 104 on clamp actuator 91C into engagement with the reaction surfaces defined by the edges 106A and 106B on the respective clamp bars 92 and 93, thus displacing the clamp bars and forcing the reaction surfaces defined by the edges 105A and 105B of the respective clamp bars 92 and 93 against the transverse cross piece 104 on each of the clamp actuators 91A and 91B which, in turn, longitudinally translate the respective draw bolts 86 and 96 toward the cover 97.

Figure 6:
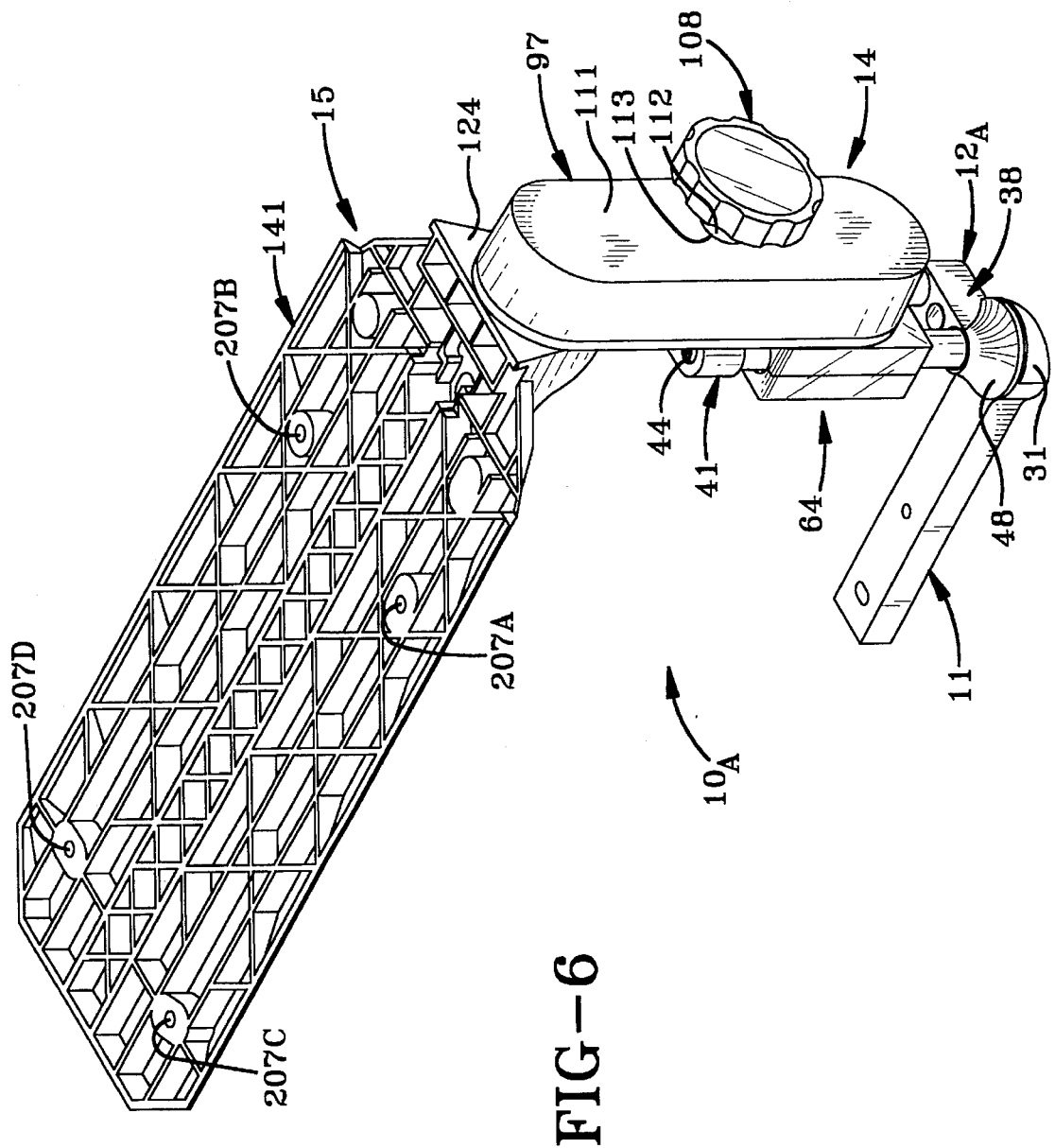
FIG. 6 is a view similar to FIGS. 3 and 5 but with all the components having been assembled.
Figure 7:
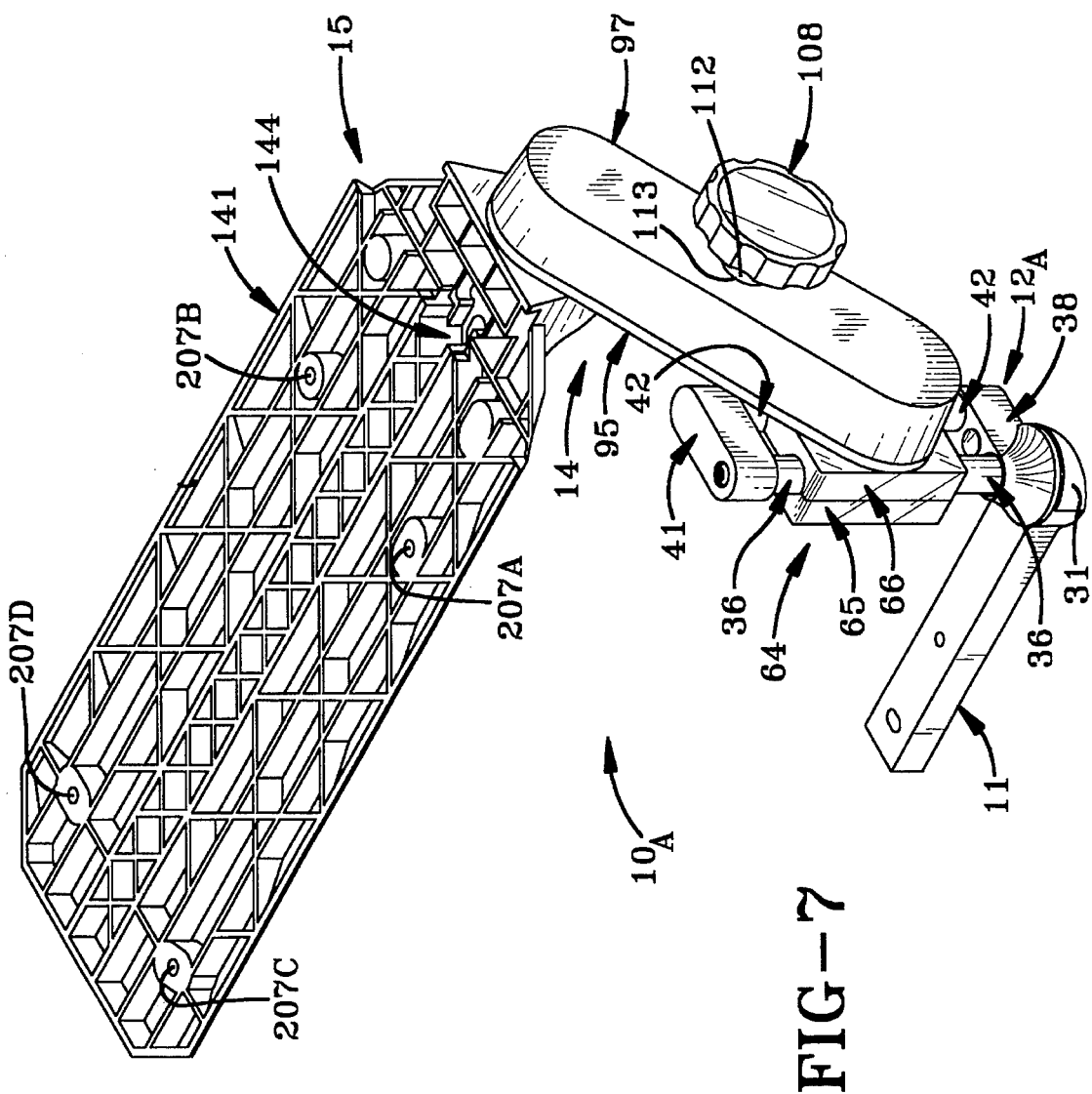
FIG. 7 is a view similar to FIG. 6 but with the arm assembly having been articulated with respect to the support assembly in order to move the tray assembly forwardly and with the tray assembly having been pivoted to remain substantially horizontal.

The arm assembly 14 has a pair of brake pads 116 and 117 disposed between the housing 95 and the second slide block 66. The second brake pad 117 has a plurality of apertures 118 which are aligned with, and receive, the posts 119 formed on the second slide block 66 to prevent relative rotation therebetween. The first brake pad 116 has a plurality of apertures 120 which engage the posts 121 (FIG. 4) extending outwardly from the housing 95 to mount the first brake pad 116 non-rotatably on the housing, or body portion, 95 of the arm assembly 14. When the adjustment control knob 108 is rotated in the tightening direction, the draw bolt 86 will cause the lock block 81 and slide block 66 to engage the guide tubes 36 and 42 with sufficient frictional contact to secure the vertical adjustment assembly 64 to the guide tubes 36 and 42, thereby directly establishing the vertical position of the articulation adjustment axis 22, and indirectly the vertical height of the tray assembly 15. The resultant translation of the draw bolt 86 will also cause the brake pads 116 and 117 to be simultaneously urged into frictional engagement, thereby establishing the angular, or articulation, position of the arm assembly 14 relative to the support assembly $12_A$. The angular position of the arm assembly 14 can be vertically oriented, as represented in FIG. 6 or skewed, as depicted in FIG. 7.

A pair of brake pads 122 and 123 are disposed between the housing 95 of the arm assembly 14 and an end surface 124 on the tray assembly 15. The second brake pad 123 has a plurality of apertures 126 which mount the pad 123 on posts 127 formed on the surface 124 to limit the relative rotation between the second brake pad 123 and the tray housing 15. The first brake pad 122 is mounted on similar posts 128 (FIG. 4) formed on the housing 95 and which are received through apertures 129 in the first brake pad 122 to limit the relative rotation between the first brake pad 122 and the housing 95. As such, when the adjustment control knob 108 is rotated in a tightening direction, the second draw bolt 96 serves to urge the brake pads 122 and 123 into frictional engagement, thereby establishing the angular position of the tray 15 about the pivot axis 24 and relative to the arm assembly 14. The tray assembly 15 can thereby be tilted independently of the angular articulation of the arm assembly 14 relative to the support assembly $12_A$.

In summary, the tilting disposition of the tray assembly 15 about the pivotal axis 24, and the articulation of the arm assembly 14 about the articulating axis 22 are independently achievable. The vertical adjustment of the tray assembly 15, accomplished by the disposition of the adjustment assembly 64 along the guide tubes 36 and 42, is also independent of the other adjustments, even though all adjustments are secured by locking mechanisms that can be actuated by a single adjustment control knob 108.

Figure 4:
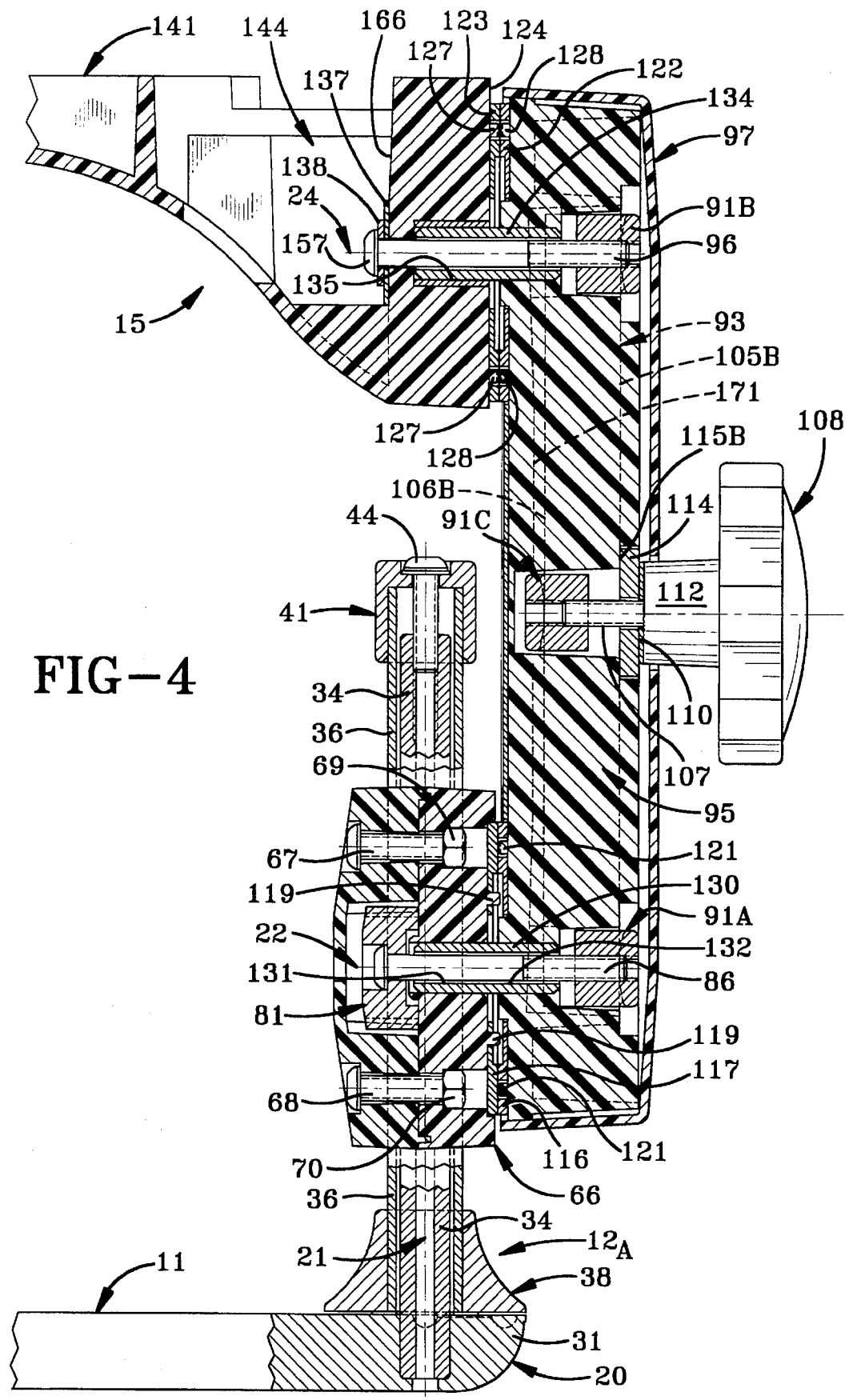
FIG. 4 is an enlarged, vertical section taken substantially along line 4—4 of FIG. 3 to depict the interrelationship between the structure of the arm assembly and the structure of the support assembly as well as between the structure of the arm assembly and the structure of the tray assembly.

As best seen in FIG. 4, the housing 95 has a first post 130 extending laterally outwardly therefrom in the direction of the second slide block 66. The first post 130 fits within an opening 131 located substantially centrally of the second slide block 66. The first post 130 has a longitudinal passage 132 extending therethrough and through which the first draw bolt 86 slidably passes prior to being threaded into the clamp actuator 91A. A second post 134 also extends laterally outwardly from the housing 95 for insertion into a bore 135 formed in the face 124 of the tray assembly 15. The second post 134 has a longitudinal passage 136 extending longitudinally therethrough to receive the second draw bolt 96 and thereby provide rotary support for, and a means by which to center, the tray assembly 15 and the second draw bolt 96 with respect to the arm assembly 14. To reduce the concentration of pressure applied by the draw bolt 96 upon the frame 141 of the tray assembly 15, one may interpose one or more washers 137 and 138 between the head 157 of the draw bolt 96 and the reaction surface 166 presented by the recess 144 in the tray frame 141.

First Variation of the First Embodiment

Figure 8:
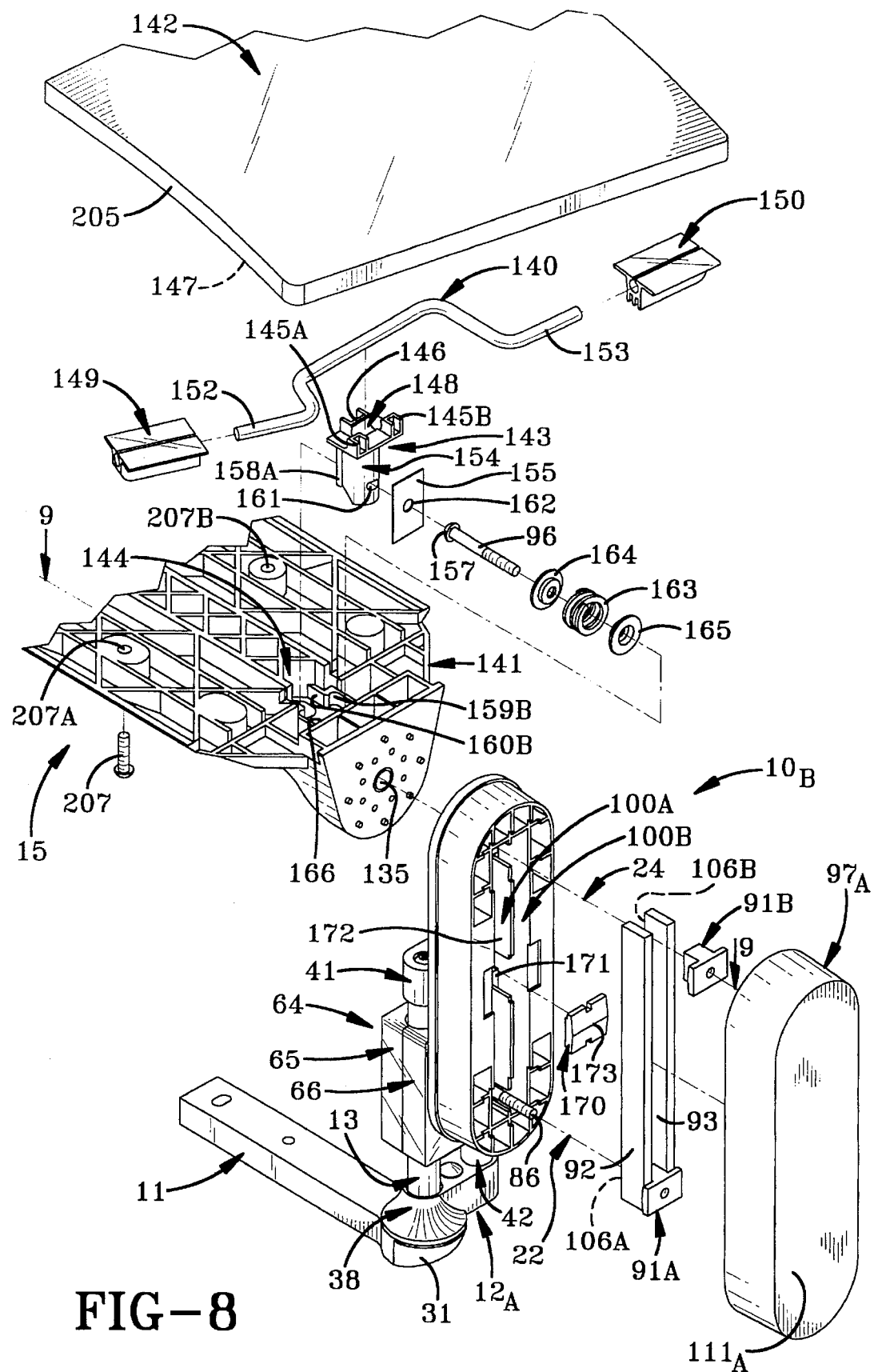
FIG. 8 is an exploded perspective of a variation of the embodiment depicted in FIGS. 3 through 7 in that the adjusting mechanism is controlled by a lever.

An adjustment mechanism $10_B$, which constitutes a variation of mechanism $10_A$, is shown in FIGS. 8, 9A and 9B. The mechanism $10_B$ incorporates the same mounting bar 11 and vertical support assembly $12_A$, as shown and described in conjunction with FIGS. 3–7. In addition, the same brake pad structure is utilized. However, the adjusting mechanism $10_B$ is different from the mechanism $10_A$ in that a double ended lever 140 (FIG. 8) is operatively positioned in the tray assembly 15. In fact, the lever 140 is located between the tray frame 141 and the tray surface member 142. So located, the lever 140 cooperatively engages a lever release actuator 143 which is disposed for swinging movement in a recess 144 provided in the tray frame 141.

The actuator 143 has dual, upwardly extending legs 145A and 145B located in spaced, and effectively opposed, relation with a single, upwardly extending leg 146. The lever 140 is received between the opposed legs 145 and 146. The upper extent of the legs 145 and 146 are disposed in proximity to the under surface 147 of the tray surface member 142 and cooperate to form a channel 148 which prevents the lever 140 from being extricated unless the tray surface member 142 is removed from the tray frame 141. The lever 140 has a pair of finger control handles 149 and 150 secured to the respective end portions 152 and 153. The finger control handles 149 and 150 are disposed beneath the tray surface member 142 out of view of the operator but within easy reach of the operator's fingers.

As best seen in FIGS. 9A and 9B, the actuator 143 has a cam surface 154 which is disposed in opposition to the bore 135 which passes through the end surface 124 of the tray frame 141. The cam surface 154 preferably has a generally cylindrical appearing cross section which abuts a reaction plate 155. The head 157 of the second draw bolt 96 is also disposed in opposition to the cam surface 154, and the head 157 is separated from the cam surface 154 by the reaction plate 155.

A pair of bearing surfaces 158A and 158B are formed on the actuator 143 and are disposed operatively to engage respective receiving journals 159A and 159B which are formed on the wall members 160A and 160B, respectively, presented by the tray frame 141 to position the receiving journals 159 within the recess 144. As the lever 140 is operated by one finger control handle 149 or the other 150, the actuator 143 will swing about one or the other of the receiving journals 159A or 159B, the results of which are more fully hereinafter described.

A spring 163 and spring seats 164 and 165 are supported on the second draw bolt 96 and are disposed between the head 157 of the draw bolt 96 and a reaction surface 166 provided in the tray frame 141. In fact, the head 157 may be received within the cupped recess 167 in spring seat 164. An opening 168 penetrates the reaction surface 166 to register with the passage 136 in the post 134 which is received within the bore 135. The second draw bolt 96 thus passes through the opening 168 and the passage 136 operatively to engage the clamp actuator 91B.

As is apparent by comparing the disposition of the actuator 143, and the components associated therewith, as represented in FIG. 9A with the disposition of the actuator 143, and the components associated therewith, as depicted in FIG. 9B, swinging movement of the actuator 143 about either receiving journal 159A or 159B will apply pressure on the spring seat 164, through reaction plate 155, to compress the spring 163 between the actuator 143 and the reaction surface 166. That same pressure applied to the reaction plate 155 is also available to act upon the head 157 to assure that the second draw bolt 96 may be displaced through a distance "A", as shown in FIG. 9B. The swinging movement which achieves the aforesaid results is depicted as occurring about receiving journal 159A, and through an angle α. The resulting translatory displacement of the second draw bolt 96 will loosen the frictional engagement between the brake pads 122 and 123 and permit tilting adjustment of the tray assembly 15. The compression of the spring 163 will also serve to return the actuator 143 to the neutral position depicted in FIG. 9A when the operator releases the finger pressure applied to either control handle 149 or 150.

In order to achieve the foregoing result the clamp actuator 91C, and the associated adjustment control knob 108 utilized in adjusting mechanism $10_A$, are replaced by a rocker plate 170 (FIG. 8) which rests transversely across the base wall 171 of the recesses 10 0A and 10 0B in the housing 95. In fact, the divider wall 172 between the recesses 100A and 100B is relieved to accommodate placement of the rocker plate 170 such that a fulcrum edge 173 presented from the rocker plate 170 will engage the edges 106A and 106B on the respective clamp bars 92 and 93 in order that the clamp bars 92 and 93 may rock. The clamp bars 92 and 93 are urged into abutment with the fulcrum edge 173 on the rocker plate 170 by the force in the spring 163 acting through the second draw bolt 96 and the clamp actuator 91B conjoined thereto. The first draw bolt 86, and clamp actuator 91A operatively connected thereto, are also subjected to the force of the spring 163 such that the spring 163 effects frictional engagement between the brake pads 116 and 117 and drives the lock block 81 into clamping engagement with the guide tubes 36 and 42.

As previously explained, control of the brake pads 116 and 117 permits selective positioning of the tray assembly 15 about the articulation axis 22, and control of the lock block 81 also permits selecting the vertical position of the tray assembly 15. Thus, through manipulation of the lever 140, the operator can individually adjust any of the position controls or simultaneously adjust any combination thereof. It should be noted that without the use of an adjusting control knob 108, the cover $97_A$ may have a continuous, uninterrupted outer surface $111_A$.

As depicted, a laterally elongated opening 161 may penetrate the actuator 143 in registry with a bore 162 through the reaction plate 155. These openings 161 and 162 permit one to access the head 157, which can accommodate an allen wrench, to adjust the initial tension of the spring 163 in order to assure that selective actuation of the lever 140 will release and tighten the adjusting mechanism $10_B$, as desired.

Second Variation of a First Embodiment

Figure 10:
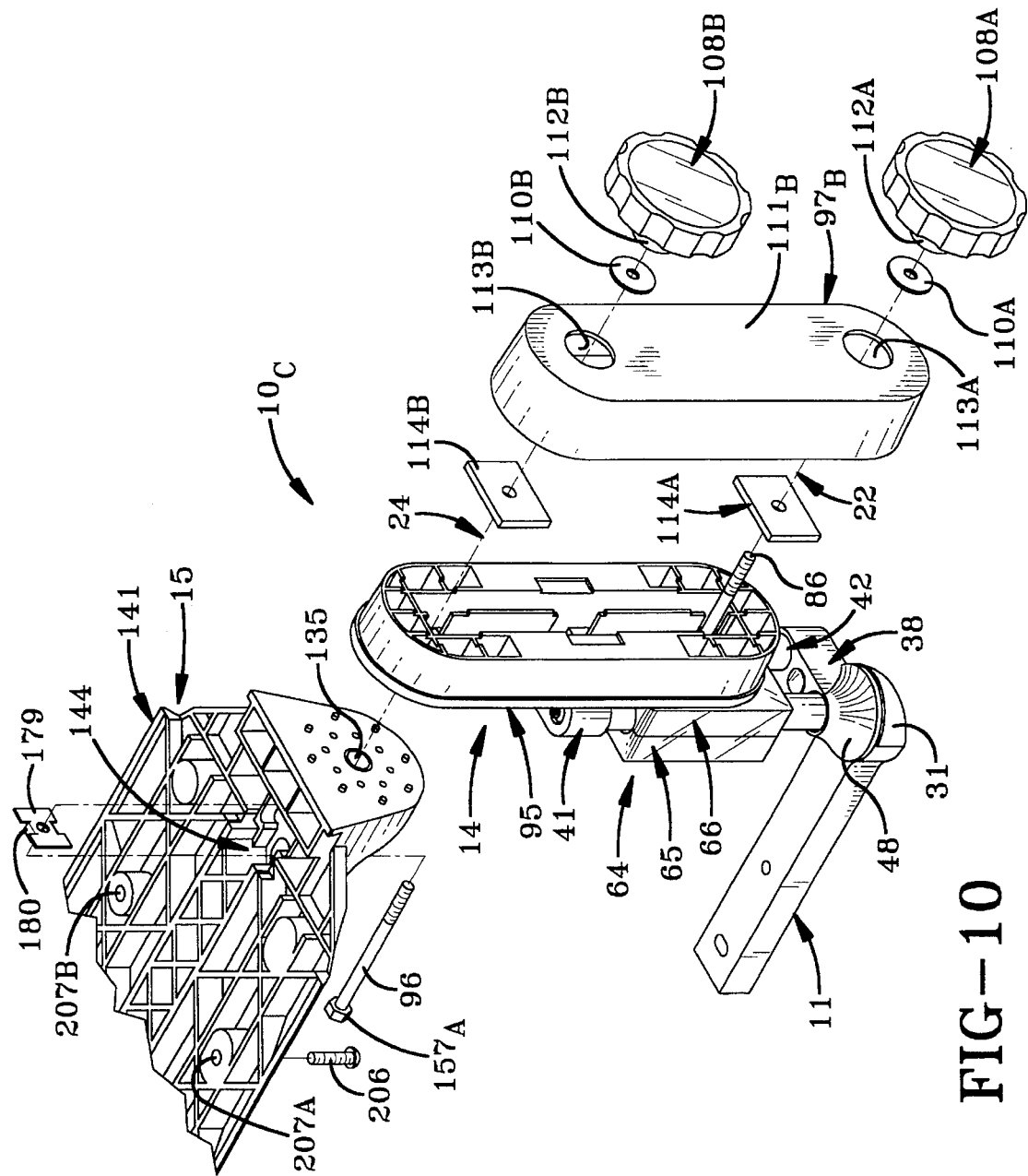
FIG. 10 is an exploded perspective of a further variation of the adjusting mechanism in that the locking mechanism is actuated by two knobs, one selectively to control articulation of the arm assembly and the vertical position thereof and the second to control pivotal movement of the tray assembly.

The variant adjusting mechanism $10_C$ shown in FIG. 10 utilizes the same components for effecting vertical adjustment of the articulation axis 22, the same components for controlling the angular positioning of the arm assembly 14 about the articulation axis 22 and for controlling the height of the articulation axis 22 as well as the same components for controlling the angular position of the tray assembly 15 about the pivot axis 24 as were previously described herein with respect to the exemplary embodiment $10_A$ depicted and described in conjunction with FIGS. 3 through 7. However, in the adjusting mechanism $10_C$ depicted in FIG. 10, the operator is provided with separate controls including one control for the adjustment around the pivot axis 24, and a second control for the vertical positioning of, and angular positioning about, the articulation axis 22.

The mechanism by which to accomplish adjustments relative to the articulation axis 22 includes a first draw bolt 86 that is directed through a thrust force distribution washer 114A operatively to engage an adjustment control knob 108A. The shank 112A on knob 108A extends through an opening 113A in the outer surface $111_B$ of the cover $97_B$ to interact with the thrust force distribution washer 114A. A bearing washer 110A may be interposed between the shank 112A and the thrust washer 114A for the same purposes previously discussed herein relative to mechanism $10_A$. Rotation of the adjustment control knob 108A provides the operator with the actuating control necessary not only for adjusting the arm assembly 14 about the articulation axis 22 but also for directly selecting the desired height of the articulating axis 22, which indirectly determines the height of the tray assembly 15.

Further with respect to the variant mechanism $10_C$, the head $157_A$ (which has a polygonal outer edge surface) on the second draw bolt 96 is captured in a hex washer plate 179 that is supported in the recess 144 provided in tray frame 141. The hex washer plate 179 has reaction tabs 180 which engage the tray frame 141 in such a way as to prevent it, and thus the second draw bolt 96, from rotating. The second draw bolt 96 also passes through the components received within the bore 135 in the tray assembly 15, as previously discussed with respect to FIGS. 3–7, and into the housing 95 operatively to engage the control knob 108B. The shank 112B on knob 108B extends through the opening 113B in the outer surface $111_B$ of the cover $97_B$ to interact with the thrust force distribution washer 114B. A bearing washer 110B may also be interposed between the shank 112B and the thrust washer 114B for the same purposes previously discussed herein. Rotation of the adjustment control knob 108B provides the operator with the actuating control necessary for adjusting the tray assembly 15 about the pivot axis 24.

Third Variation of a First Embodiment

Figure 11:
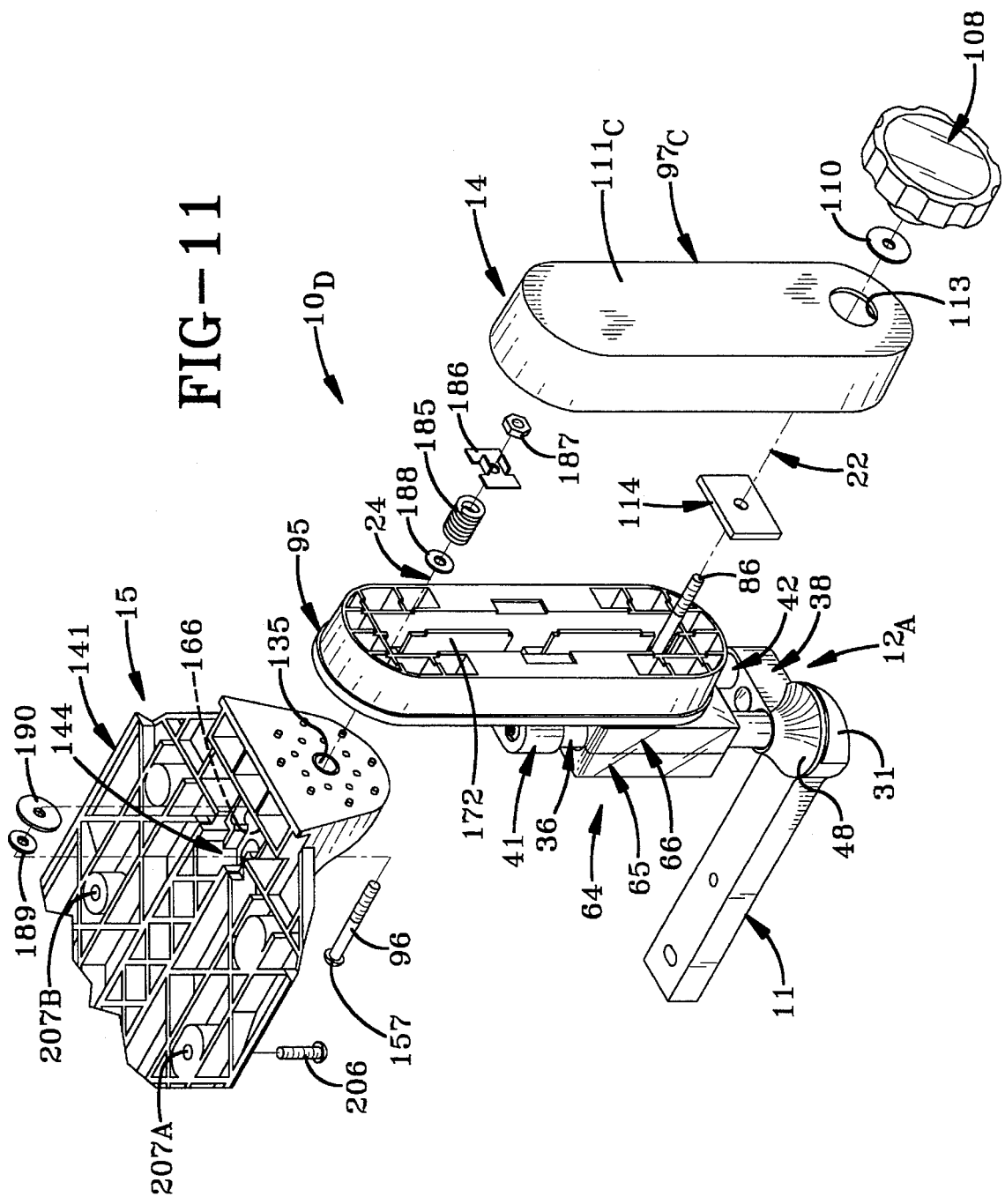
FIG. 11 is an exploded perspective of another variation in which the locking mechanism which controls pivotal adjustment of the tray assembly is spring biased to permit pivotal adjustment of the tray assembly without either a lever or a knob being required to actuate the locking mechanism but the locking mechanism which controls articulation of the arm assembly, and the vertical position thereof, is actuated by a knob.

The variation represented by the adjusting mechanism $10_D$ shown in FIG. 11 provides a single adjustment control knob 108 for actuating the locking mechanism by which to permit selection of the vertical disposition of the articulation axis 22, and articulation of the arm assembly 14 thereabout, as described in conjunction with FIG. 10. Although that description is not repeated at this location, the structure which permits the draw bolt 86 to interact with the adjustment control knob 108 through the single opening 113 in the outer surface $111_C$ of the cover $97_C$ is identified by the same numbers in FIG. 11 as are used in conjunction with the description for the same structure as that structure was described relative to the variation shown and described in conjunction with FIG. 10 set forth previously herein.

A friction resistant arrangement is employed to control the angular positioning of the tray assembly 15 about the pivot axis 24. The friction resistant adjustment for tilting the tray assembly 15 employs a pair of brake pads 122 and 123, as shown and described with respect to FIGS. 3 and 4, which are maintained in engagement by a spring 185 which surrounds the second draw bolt 96 and is confined between the housing 95 and a hex washer plate 186. The draw bolt 96 threadably engages a nut 187 which is captured by, and therefore held non-rotatable relative to, the hex washer plate 186 which in turn is held non-rotatable relative to the housing 95 by its engagement with the divider wall 172 in the housing 95. A washer 188 may be employed not only to reduce the force concentration on the housing 95 but also to protect the housing 95 from possible degradation by engagement between the spring 185 and the material from which the housing 95 might be made. Likewise, a bearing washer 189 and a force distribution washer 190 may be received in the recess 144 to reduce the force concentration between the round head 157 of the draw bolt 96 and the reaction surface 166 at one end of the recess 144 in the tray frame 141. Thus, the friction forces in the brake pads 122 and 123, which may be identical to those depicted in FIGS. 3 and 4, will determine the angular position of the tray assembly 15 about the pivot axis 24. The amount of friction force available is determined by the force applied by spring 185 which, of course, is controlled by the tightness of the nut 187 on the draw bolt 96. As such, the spring force can be changed by simply tightening or loosening the draw bolt 96 into the captured nut 187.

Fourth Variation of a First Embodiment

Figure 12:
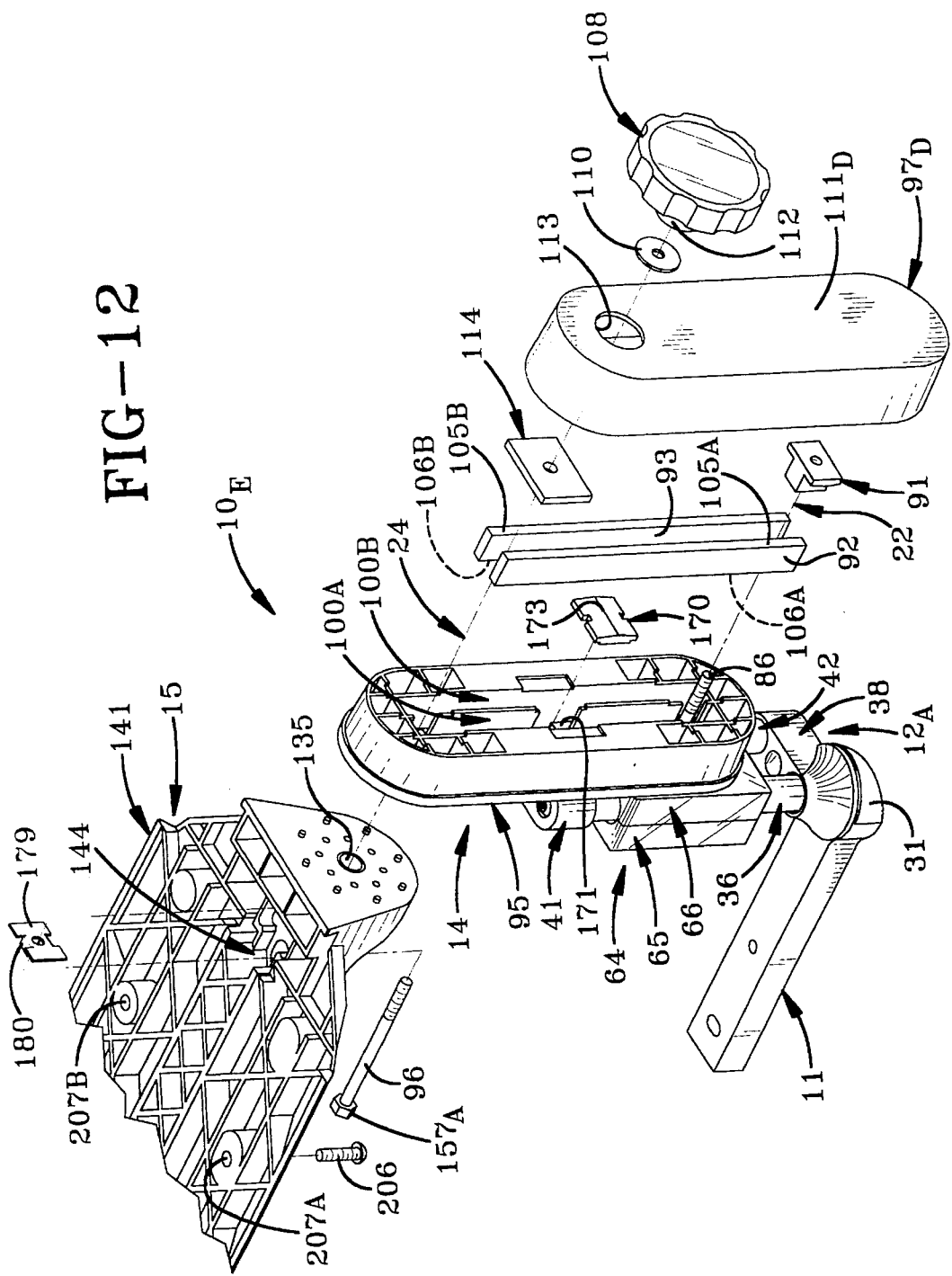
FIG. 12 is an exploded perspective of a further variation wherein the locking mechanism for controlling articulation, pivotal movement and elevation of the tray assembly are actuated by a single knob.

The variation embodied in adjusting mechanism $10_E$ represented in FIG. 12 uses the same braking arrangement at the lower end of the arm assembly 14 as previously described herein with respect FIGS. 3, 8 and 10 to release and hold articulation, and the vertical disposition, of the arm assembly 14. However, the braking arrangement is actuated by the same rocking arrangement of the clamp bars 92 and 93 employed in variation $10_B$ shown and described in relation to FIG. 8. The primary difference is that in mechanism $10_E$ actuation is effected by a single adjustment control knob 108 in a manner similar to that by which actuation is effected with the adjusting control knob 108B employed with variation $10_C$—as shown and described in conjunction with FIG. 10. Thus, while the clamp bars 92 and 93 and rocker plate 170 are identical to the construction of mechanism $10_B$—as represented and described in conjunction with FIG. 8—rocking the clamp bars 92 and 93 to actuate the brake pads 116 and 117 is effected by manipulation of the single actuating control knob 108 by applying, or releasing, pressure against the clamp bars 92 and 93 with the thrust force distribution washer 114.

Actuating control to select the tilted disposition of the tray assembly 15 about the pivot axis 24 utilizes the arrangement that is shown and described with respect to mechanism $10_C$ depicted in FIG. 10. That is, the head $157_A$ (which has a polygonal outer edge surface) on the second draw bolt 96 is captured in a hex washer plate 179 that is supported in the recess 144 provided in tray frame 141. The hex washer plate 179 has reaction tabs 180 which engage the tray frame 141 in such a way as to prevent it, and thus the second draw bolt 96, from rotating. The second draw bolt 96 also passes through the components received within the bore 135 in the tray assembly 15, as previously discussed with respect to FIGS. 3–7, and into the housing 95 operatively to engage the control knob 108. The shank 112 on knob 108 extends through the opening 113 in the outer surface $111_D$ of the cover $97_D$ to interact with the thrust force distribution washer 114. A bearing washer 110 may also be interposed between the shank 112 and the thrust washer 114 for the same purposes previously discussed herein.

Figure 5:
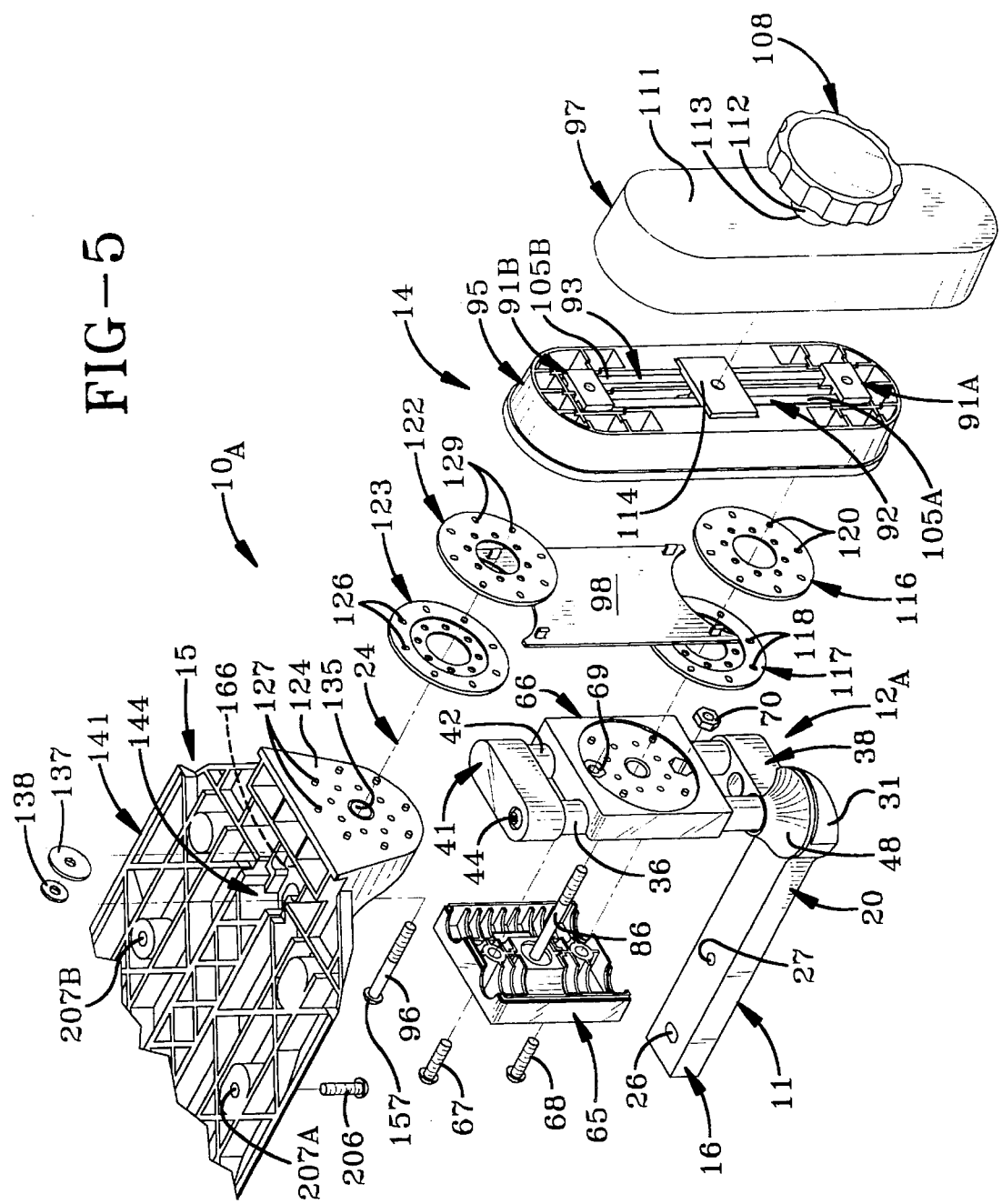
FIG. 5 is a view similar to FIG. 3 but with the vertical support assembly represented as having been assembled to the mounting bar and with a number of the components in the support assembly as well as a number of components in the arm assembly having also been assembled.

To summarize, loosening the adjustment control knob 108 directly releases the force which drives the brake pads 122 and 123 (shown and described in conjunction with the arrangement depicted in FIGS. 3–5) to permit tilting adjustment of the tray assembly 15. This same movement of the knob 108, however, also loosens not only the brake pads 116 and 117 but also the lock block 81 in the vertical support assembly $12_A$ by the rocking action of the clamp bars 92 and 93. As described in conjunction with mechanism $10_B$ depicted in FIG. 8, the reaction of the clamp bars 92 and 93 against the rocker plate 170 is effective selectively to apply, and withdraw, the force required to draw the brake pads 116 and 117 into frictional engagement and simultaneously force the lock block 81 into engagement with the guide tubes 36 and 42. Thus, not only is the tilted position of the tray assembly 15 adjustable by manipulation of a single adjustment control knob 108 in the variant mechanism $10_E$ but also the articulation, and height, of the arm assembly 14.

Second Embodiment

Figure 13:
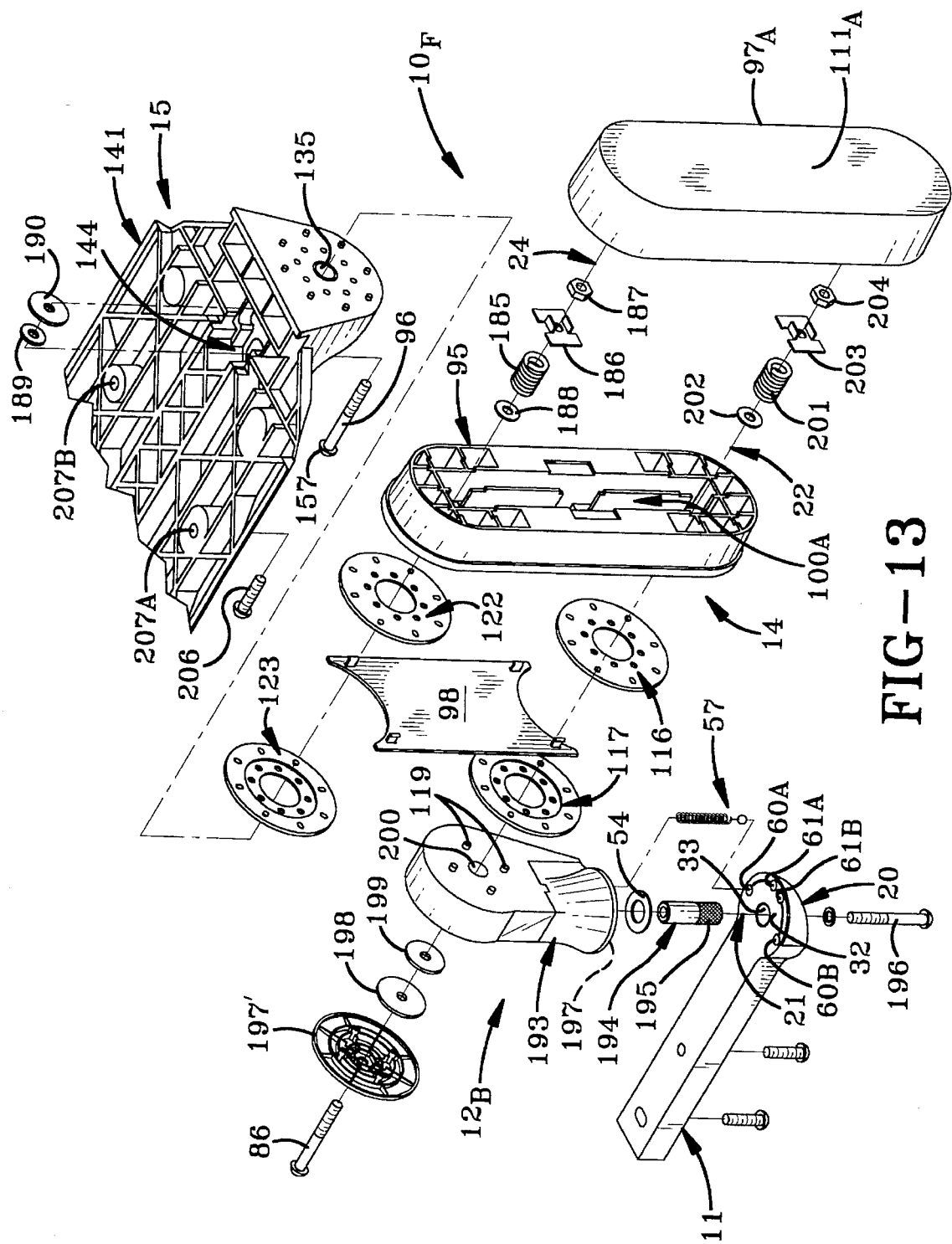
FIG. 13 is an exploded perspective of a still further variation of the adjusting mechanism in that the locking mechanism which controls articulation of the arm assembly and pivotal movement of the tray assembly are both spring biased to permit those adjustments without the necessity to actuate either a lever or a knob, while elevation is fixed.

In the embodiment represented by mechanism $10_F$ depicted in FIG. 13 the vertical position of the tray assembly 15 provided by the support assembly $12_B$ is fixed. However, the mechanism $10_F$ provides for adjustment of the tray assembly 15 about the pivot axis 24, adjustment of the arm assembly 14 about the axis of articulation 22 and rotational movement of the support assembly $12_B$ about the vertically oriented rotational axis 21. Adjustment about the rotary axis 21 is accomplished in a manner similar to that provided in each of the foregoing variations. That is, recesses 60 and 61, in the mounting bar 11, and a conventional ball detent assembly 57, presented from the vertical support assembly $12_B$, cooperatively interact. The support assembly $12_B$ has a stanchion 193 that houses the ball detent mechanism 57, and the support assembly $12_B$ is rotatably mounted on the mounting bar 11 by a post 194 having a knurled end 1195 that may be press fit into the opening 33 in the distal end portion 20 of the mounting bar 11. The knurling precludes rotation of the post 194 relative to the mounting bar 11. A threaded fastener 196 extends upwardly through the post 194 and threadably engages the stanchion 193. A thrust washer 54 is disposed between the base 197 of the stanchion 193 and the upwardly facing surface 32 of the mounting bar 11.

Angular control of the arm assembly 14 about the articulation axis 22 is controlled by a spring-biased friction arrangement generally comparable to that shown for the pivot axis 24 control in mechanism $10_D$ shown and described in conjunction in conjunction with FIG. 11. That is, the draw bolt 86 passes through a decorative cover 197', a pair of thrust washers 198 and 199 and an opening 200 which penetrates the stanchion 193. The draw bolt 86 then passes through the brake pads 116 and 117. Brake pad 116 is non-rotatably carried on the housing 95 in the same manner shown and described in conjunction with FIGS. 3 and 4. Posts 119 are presented from the stanchion 193 in the same manner as the posts 119 are presented from the slide block 66 shown and described with respect to those figures so that brake pad 117 may be non-rotatably carried on stanchion 193.

After the draw bolt 86 passes through housing 95 it is surrounded by a spring 201 which is retained between a washer 202 that engages the housing 95 and the hex washer plate 203 which also engages the housing 95. The thrust washer 202 is disposed between the end of spring 201 and the base wall 171 (FIG. 4) in the housing 95. The hex washer plate 203 spans both, and is retained in, the recesses 100 in housing 95 in spaced relation outwardly from the base wall 171. A hex nut 204 is captured by the hex washer plate 203 such that the nut 204 is also non-rotatable with respect to the housing 95. The frictional force present to determine the angular position of the arm assembly 14 is established by the tightness of the draw bolt 86. This force may, of course, be adjusted by tightening the draw bolt 86 into the captured nut 204.

The angular position of the tray assembly about the pivot axis 24 may be established and provided by a structure identical to that previously described herein the variant mechanism $10_D$ shown in FIG. 11. It is believed that a repetition of that description is not necessary.

Variations of the Second Embodiment

Figure 14:
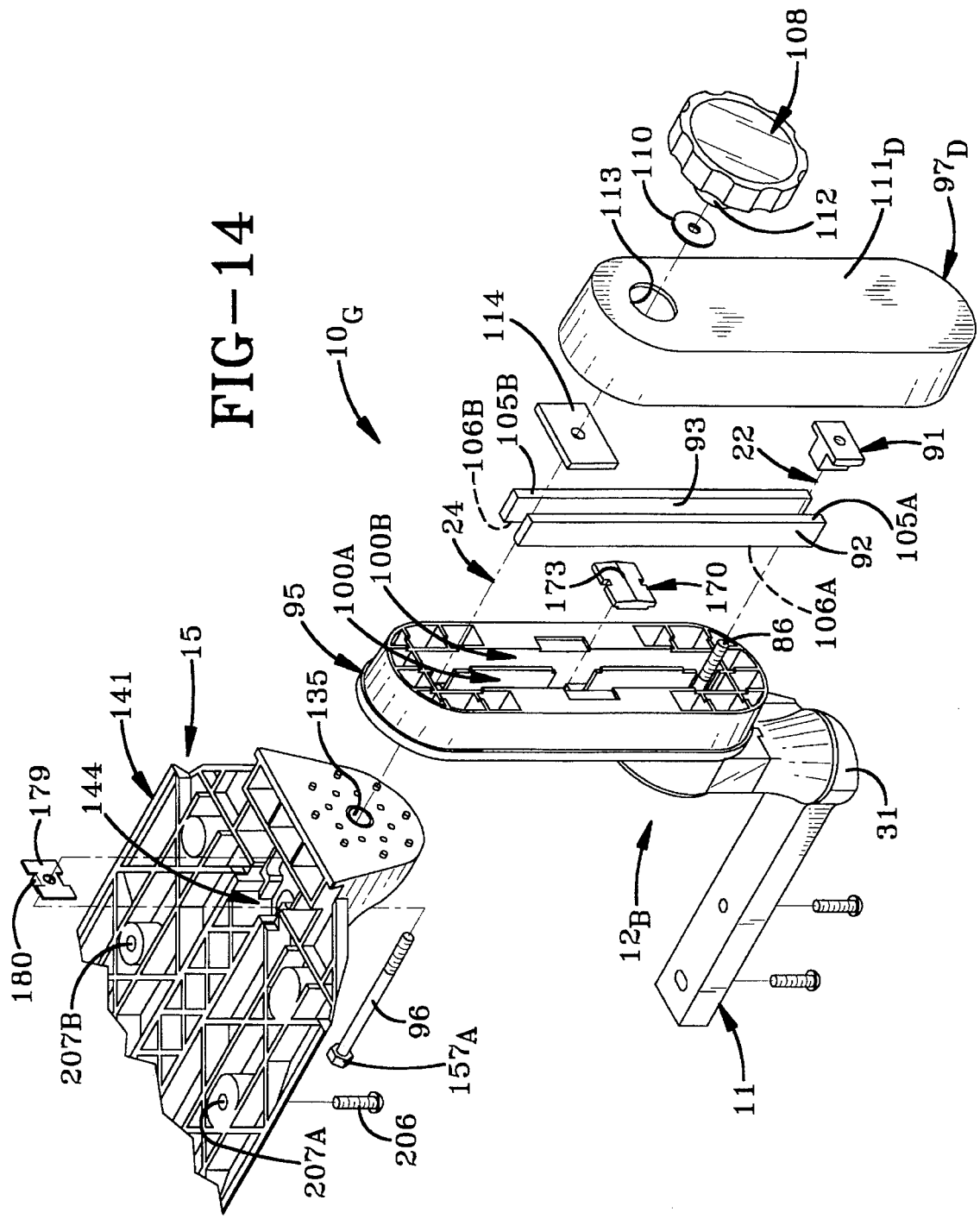
FIG. 14 is an exploded perspective of an even further variation wherein the locking mechanism for controlling articulation of the arm assembly and pivotal movement of the tray assembly are actuated by a single knob located in proximity to one end of the arm assembly, while elevation is fixed.

The variation embodied in the adjusting mechanism $10_G$ shown in FIG. 14 utilizes a vertical support $12_B$ which may be identical to that incorporated in mechanism $10_F$ represented in FIG. 13, and the angular controls relative to the disposition of the arm assembly 14 about the articulation axis 22 and the tray assembly 15 about the pivot axis 24 may be identical to those used in conjunction with the mechanism variation $10_E$ disclosed in FIG. 12.

Figure 15:
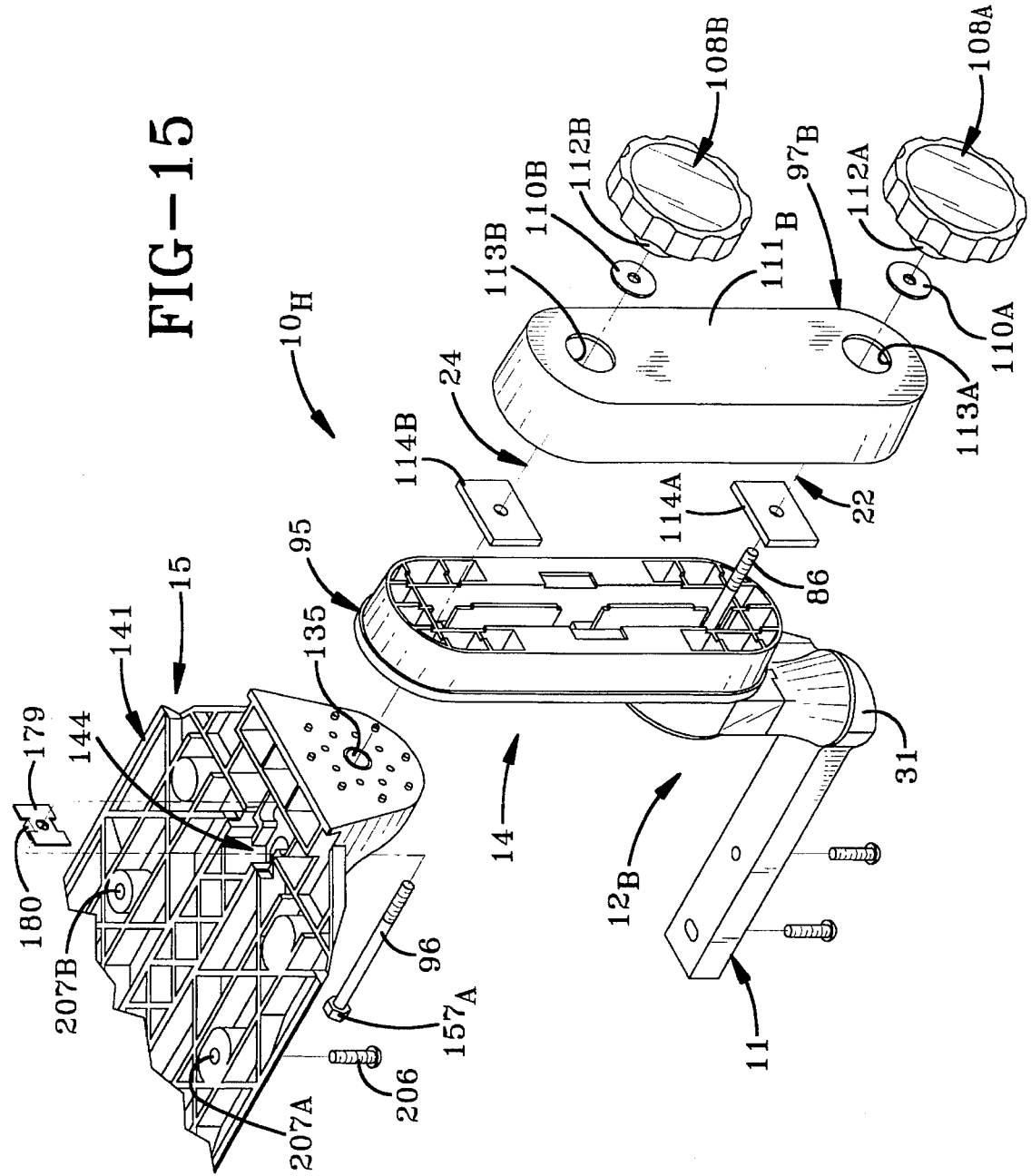
FIG. 15 is an exploded perspective of a variation of the embodiment depicted in FIG. 14 wherein the locking mechanism for controlling articulation of the arm assembly and pivotal movement of the tray assembly are individually actuated by separate knobs, one for controlling articulation of the arm assembly and one for controlling pivotal movement of the tray assembly.
Figure 16:
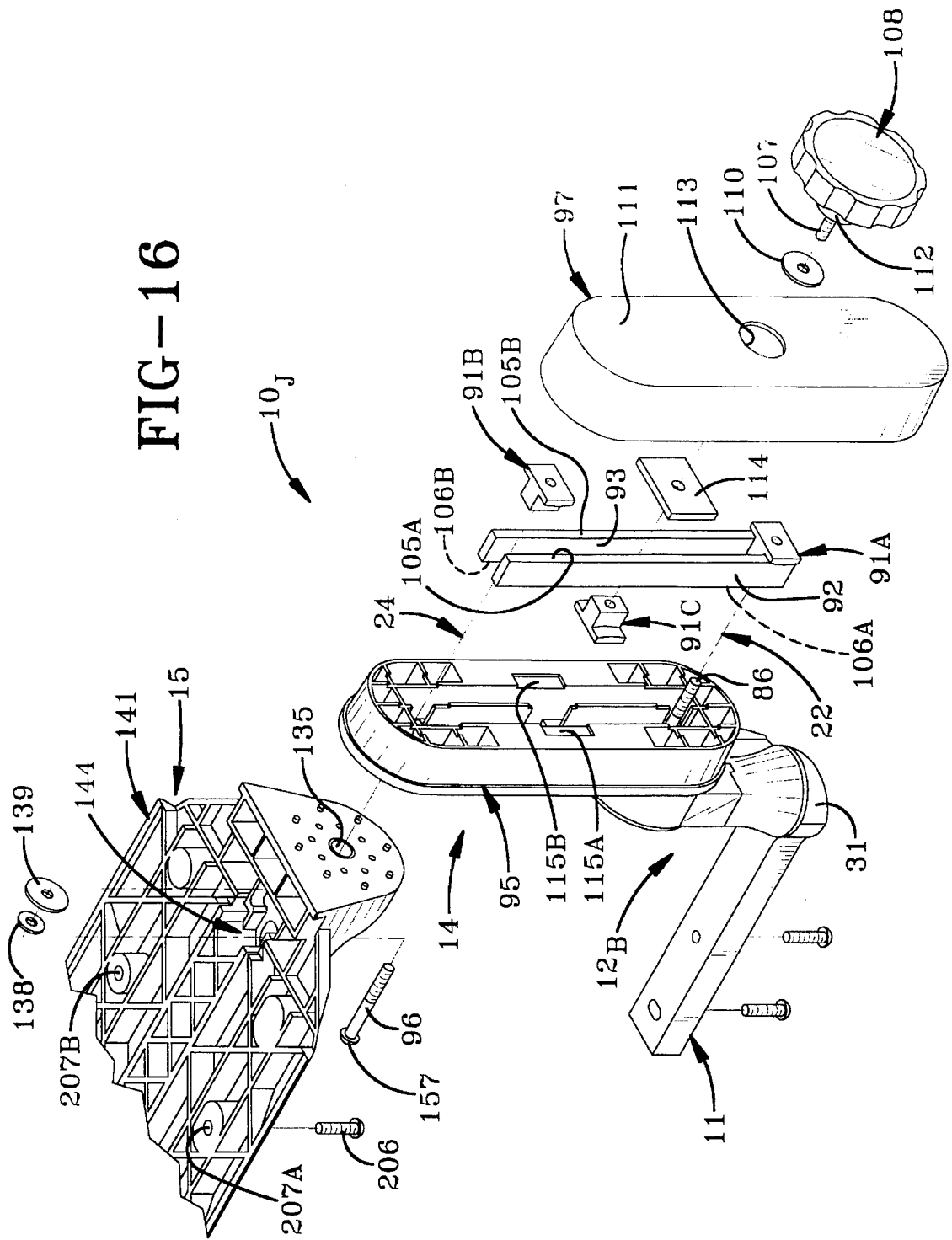
FIG. 16 is an exploded perspective of a further variation of the embodiment depicted in FIGS. 14 and 15 wherein the locking mechanism for controlling articulation of the arm assembly and pivotal movement of the tray assembly are actuated by a single knob located centrally of the arm assembly.

The variations $10_H$ and $10_J$ shown in FIGS. 15 and 16, respectively, both use vertical support assemblies $12_B$ identical to those shown in FIG. 13. The FIG. 15 variation $10_H$ utilizes, in the angular controls for the articulation axis 22 and the pivot axis 24, structure that is identical to that described relative to variation $10_C$ shown in FIG. 10. Adjustment mechanism variation $10_J$ depicted in FIG. 16, while utilizing a vertical support assembly $12_B$ described in conjunction with variation $10_F$ shown in FIG. 13, also utilizes structure that is identical to that described with respect to FIG. 3 to effect the angular controls about the articulation axis 22 and the pivot axis 24.

Third Embodiment

In the embodiment represented by mechanism $10_G$ depicted in FIGS. 17, 18 and 19 the vertical position of the tray assembly 15 is not provided by the support assembly $12_D$. Rather, the mechanism $10_G$ provides for all adjustments of the tray assembly 15 by the utilization of at least two, unique arm assemblies, such as identified by the numerals $14_A$ and $14_B$. These arm assemblies $14_A$ and $14_B$ permit selective rotational adjustment of the tray assembly 15 about a pivot axis 220 (FIG. 18A) as well as selective vertical adjustment of the height of the tray assembly 15 relative to the support assembly $12_D$—by articulation about both a first articulation axis 221 and an intermediate articulation axis 222, as will be hereinafter described in detail with respect to FIG. 18B.

With particular reference to FIG. 18B, rotational movement of the support assembly $12_D$ about the vertically oriented rotational axis 21 is accomplished in a manner similar to that provided in each of the foregoing embodiments, and their variations. However, rather than designate particular locations to which the tray assembly 15 may be indexed—as by the use of a detent arrangement—a limit pin 223 that is presented from the stanchion $193_A$ in the vertical support assembly 12D cooperatively interacts with an arcuate recess 224 provided in the upwardly facing surface 32 of the mounting bar 11, and in proximity to the distal end portion 20 thereof, to permit a desired range of rotational movement about axis 21. The stanchion $193_A$ is rotatably mounted on the mounting bar 11 by a post 194, one end portion 195 of which may be press fit into an opening 33 in the upwardly facing surface 32 of the mounting bar 11. The opening 33 is disposed concentrically with respect to the arcuate recess 224.

The supporting spindle portion 225 of the post 194 extends upwardly from the end portion 195 to be received in a bearing bore 226 that penetrates the base 197 of the stanchion $193_A$. The arrangement by which the stanchion $193_A$ is supported from the mounting bar 11 provides for movement of the tray assembly 15 about the vertically disposed rotational axis 21.

The stanchion $193_A$ in the support assembly 12D is also penetrated by a draw bore 228 that extends transversely of, and is offset from, the bearing bore 226. The draw bore 228 receives a first draw bolt 229 that lies coincident with the first articulation axis 221. As depicted, the first draw bolt 229 may well be an Allen head shoulder bolt, the threaded end portion 230 on the shaft 231 of which receives a self-locking, flange nut 232A that cooperatively interacts with the hereinafter described rocker lever 250B in arm assembly $14_B$. The shoulder 233 on the head portion 234 of the first draw bolt 229 may engage the base 235 of a recess 236 in the stanchion $193_A$ or, as shown, a washer 237 may be interposed therebetween to distribute the forces applied by the head portion 234 across the base 235 of recess 236. The arm assembly $14_B$ is supported by, and articulates with respect to, the first draw bolt 229, which defines the first articulation axis 221. By using an Allen head draw bolt 229 in conjunction with the flange nut 232A on-site adjustment of the rocker lever 250B in arm assembly $14_B$ with respect to the stanchion $193_A$ is readily accomplished. The adjustment permitted by the aforesaid structural arrangement will not be fully appreciated until the operative relationship between the rocker lever 250B and the stanchion $193_A$ is hereinafter more fully described.

A second draw bolt 238, which may also be an Allen head shoulder bolt, defines the second, or intermediate, articulation axis 222 (FIGS. 18A or 18B). As depicted, the threaded end portion 230 on the shaft 231 of the second draw bolt 238 receives a self-locking, flange nut 232B that cooperatively interacts with the hereinafter described rocker lever 250A in arm assembly $14_A$. The shoulder 233 on the head portion 234 of the second draw bolt 238 cooperatively interacts with the rocker lever 250B in arm assembly $14_B$ through the washer 237. As such, the arm assembly $14_A$ is supported by, and articulates with respect to, the arm assembly $14_B$ through the second draw bolt 238. The Allen head draw bolt 238 and flange nut 232B permit on-site adjustment of the forces applied between the rocker lever 250B in arm assembly $14_B$ and the rocker lever 250A in arm assembly $14_A$. The adjustment permitted by the aforesaid structural arrangement will also not be fully appreciated until the operative relationship between the rocker levers 250A and 250B is hereinafter described.

Similarly, the tray assembly 15 is supported from the arm assembly $14_A$ by a third draw bolt 239 (FIGS. 18A and 19). The third draw bolt 239, which may also be an Allen head shoulder bolt, defines the pivot axis 220. As depicted, the threaded end portion 230 on the shaft 231 of the third draw bolt 239 may receive an adjustment control knob 240 that interacts with rocker lever 250A in arm assembly $14_A$. The washer 237 engaged by the shoulder 233 on the head portion 234 of the third draw bolt 239 cooperatively interacts with the tray frame $141_A$ from which a tray surface (not shown) may be supported, as in the prior embodiments. The details of the interaction between the third draw bolt 239 and the tray assembly 15 will be hereinafter more fully explained. For the present, suffice it to say that the tray assembly 15 is supported by, and pivots with respect to, the arm assembly $14_A$ through the third draw bolt 239. As such, the interaction between the draw bolt 239 and the adjustment control knob 240, as will also become apparent, serves to control all adjustments by which to select the desired location of the tray assembly 15 relative to the support bar 11 provided by the mechanism $10_G$.

There are modest differences between the two arm assemblies $14_A$ and $14_B$, but they relate primarily to the cover caps 241, the structure of which is particularly influenced by the location, and configuration, of the adjustment control knob 240 chosen to operate the adjusting mechanism $10_G$. Accordingly, a description of the structure of either arm assembly 14 will suffice to acquaint the reader with the structure of the other arm assembly, as well.

With particular reference to FIGS. 18A, 18B and 19 it can be seen that the arm assemblies 14 each employ a housing 245. Each housing 245 may, if desired, be an extruded member, but irrespective of how they are manufactured, each housing has a base portion 246 and a plurality of wall members such as: the lateral side walls 247A and 247B over which the cover caps $241_A$ and $241_B$, respectively, are received; the longitudinally extending center wall 248; and, the longitudinally extending boundary walls 249A and 249B which are spaced laterally with respect to the center wall 248 to define an appropriate cavity, or cavities, within which to receive a rocker lever 250. Each of the aforesaid walls 247, 248 and 249 extend outwardly from one side of the base portion 246.

The rocker levers 250, being identical, can be described by reference to rocker lever 250A depicted in FIGS. 18A and 19. As shown, the preferred rocker lever 250A may, for stability, have a pair of laterally spaced side bars 251A and 251B that are secured together by end cross plates 252A and 252B as well as by a central cross plate 253. By adopting the particular configuration depicted for the rocker levers 250, the longitudinally extending boundary walls 249A and 249B cooperate with the center wall 248 to define the laterally spaced cavities 254A and 254B within which the respective side bars 251A and 251B of the rocker lever 250 are received for the required motion of the rocker lever 250.

Before continuing with a description of the structural details of the rocker levers 250 it will be observed that each rocker lever 250 has opposite end portions 255 and 256 as well as a medial portion 258. As will hereinafter become more fully apparent, the one end portion 255 15resents an input/reaction location; the medial portion 258 also presents an input/reaction location; and, the other end portion 256 presents an output location. As such, each rocker lever 250 is provided with two input/reaction locations and a single output location.

With respect to the rocker arm 250B (FIG. 18B) utilized in conjunction with the arm assembly 14$_B$, the end cross plate 252A—located at end portion 255 of the rocker lever 250B—is provided with a connecting bore 259. The connecting bore 259 in end cross plate 252A serves as one input/reaction connector location, and the end cross plate 252B—located at end portion 256 of the rocker arm 250B— is also provided with a connecting bore 259. The connecting bore 259 in end cross plate 252B serves as the output connector location on rocker lever 250B. With the two end portions 255 and 256 of the rocker lever 250B serving as the input/reaction and output locations, respectively, the medial portion 258 of the rocker lever 250 serves as the second input/reaction location. Specifically, the central cross plate 253 is also provided with a connecting bore 260 that may serve as the second input/reaction connector location. In the embodiment depicted in FIGS. 17–19, however, the connecting bore 260 is not utilized. On the other hand, the connecting bore 260 is utilized in the variation depicted in FIG. 20, as will be hereinafter explained.

It should be observed that the flanges 261A and 261B on each nut 232 extend outwardly in opposite directions to engage the laterally spaced side bars 251A and 251B, respectively, which extend perpendicularly outwardly beyond the situs of each end cross plate 252. In addition, one edge 262 of the aligned flanges 261A and 261B may engage a tab 263 that also extends perpendicularly outwardly from each end cross plate 252. The laterally spaced side bars 251 and the associated tab 263 that extends perpendicularly therebetween form three rectilinear side walls that capture the flanges 261 so that the nut 232 will not rotate with respect to the connecting bore 259 through the end cross plate 252 which receives the flange nut 232. By thus capturing the oppositely directed flanges 261 adjustment of the draw bolts 229, 238 and 239 with which the flange nuts 232 are used is facilitated.

When a flange nut 232 is not used with one of the end cross plates 252, the tab 263 associated with that cross plate 252 may be broken away to assure full surface engagement of the hereinafter described thrust washer 279 against the end cross plate 252 with which the thrust washer 279 is used.

In the embodiment presently being described, a pivot point 265, which is located within the medial portion 258 of the rocker lever 250B, serves as the reaction location. That is, the side bars 251A and 251B each present a downwardly directed edge 264 which convergingly tapers to a pivot point 265 that engages the base portion 246 of the housing 245. The pivot point 265, which is located within the medial portion 258 of the rocker lever 250 serves as a reaction location when the connector bore 260 is not used, as in the embodiment being currently described. When the pivot point 265 is utilized as a reaction location, that area of the base portion 246 which is engaged by the pivot point 265 serves as a fulcrum 266. The medial portion 258 of the rocker lever 250 thus provides an input/reaction location, irrespective of whether the connection is effected through the pivot point 265 or the connector bore 260.

As is best seen in FIGS. 18, the taper of the downwardly directed edge 264 on each side bar 251 does not necessarily converge equally along both sides of the pivot point 265. As such, one can locate the pivot point 265 at preselected distances along the length of the rocker lever 250. It has been found to be desirable to locate the pivot point 265 closer to the output connection—identified as the connector bore 259 in the end cross plate 252B of rocker lever 250B. The location of the pivot point 265 along the longitudinal extent of the rocker lever 250B, as depicted, is preferably concomitant with the longitudinal location of the bore 260.

With continued reference to FIGS. 18A and 19, the tray assembly 15 presents a generally vertically oriented, mounting plate 268 at one end of the tray frame 141$_A$. The mounting plate 268 is pierced by an aperture 269 through which the draw bolt 239 is received. The washer 237 that may be associated with the head portion 234 of the draw bolt 239 engages the rear face 270 of the mounting plate 268. The shaft portion 231 of the draw bolt 239 also extends through the center aperture 271 of a brake pad 272A that is interposed between the exterior face 273 on the mounting plate 268 and the opposed face 274 on one side of the base portion 246 of the housing 245A. A bore 275A extends through the base portion 246 and continues through the center wall 248 to open into a recess 276 that extends transversely across the bifurcated edge 278 of the center wall 248. The bore 275A aligns with the bores 269 and 271 as well as the connecting bore 259 in the end cross plate 252A on rocker lever 250A. As such, the threaded portion 230 of the draw bolt 239 can pass through the aforesaid aligned bores as well as through a thrust washer 279 and through a bearing washer 280 to be operatively engaged by an adjustment control knob 240. Specifically, the shank portion 281 of the adjustment control knob 240 extends through an aperture 282 in the cover cap 241$_A$ to engage the bearing washer 280 and be mounted onto the threaded end portion 230 of the draw bolt 239. The cover cap 241$_A$ may be mounted on the housing 245A by a plurality of self-threading screws 284 which interact with the bifurcated edge 278 on the center wall 248 removably to secure the cover cap 241$_A$ to the housing 245A.

With reference to FIG. 18A or 18B, the washer 237 that may be associated with the head portion 234 of the draw bolt 238 (which defines the intermediate axis 222) engages the end cross plate 252A on the rocker lever 250B in arm assembly 14$_B$. The shaft portion 231 of the draw bolt 238 extends through the connecting bore 259 in end cross plate 252A, through the bore 275A in housing 245B and through the central aperture 271 in a brake pad 272B that is interposed between the exterior face 274 on base portion 246 of housing 245B and the opposed face 274 on one side of the base portion 246 of the housing 245A.

A bore 275B, like its counterpart 275A extends through the base portion 246 of housing 245A and continues through the center wall 248 to open into a recess 276B that extends transversely across the bifurcated edge 278 of the center wall 248. The bore 275B aligns with the bore 259 in end cross plate 252B of the rocker lever 250A in arm assembly $14_A$. As such, the threaded portion 230 of the second draw bolt 238 can pass through the aligned bores 259, 275A, 271 and 275B to be operatively engaged by the flange nut 232B.

To facilitate frictional engagement between all the members capable of relative articulation, a brake pad 272C may also be interposed between the surface 274 on the base portion 246 of housing 245B in arm assembly $14_B$ and the opposed surface 285 on stanchion $193_A$.

In summary, when the adjustment control knob 240 tightens, or loosens, the tension in the third draw bolt 239, one can, with that single control effect an adjustment of the tray assembly 15 about the pivotal axis 220. In fact, movement of the tray assembly 15 about the pivotal axis 220 is possible as soon as the frictional engagement of the brake pad 272A between the exterior face 273 on the mounting plate 268 and the opposed face 274 on the base portion 246 of the housing 246A is sufficiently reduced. Rotation of the adjustment control knob 240 to reduce the tension on the third draw bolt 229 effects the desired reduction of the clamping force on the brake pad 272A such that rotation of the tray assembly 15 about the pivotal axis 220 may be achieved, and tightening of the knob 240 secures the tray assembly 15 in the desired position to which it is rotated about pivotal axis 220.

In addition, one can, with the single adjustment control knob 240, also effect an adjustment in the vertical height, and/or the horizontal location, of the tray assembly 15 relative to the supporting bar 11. As the tension in the third draw bolt 239 is reduced the rocker lever 250A will be permitted to rotate clockwise about the fulcrum 266, which, as viewed in FIG. 18A, is engaged by the reaction location which in the embodiment being described is the pivot point 265. Clockwise movement of rocker lever 250A permits the rocker lever 250B in arm assembly $14_B$ to rotate counterclockwise about its reaction location, which is also the engagement of the pivot point 265 on rocker lever 250B with the fulcrum 266 in the housing 245B in arm assembly $14_B$ (FIG. 18B).

The aforesaid rocking movements of the levers 250 reduce the frictional clamping action against all three of the brake pads 272 such that the arm assembly $14_B$ can articulate about axis 221 and the arm assembly $14_A$ can articulate about axis 222, as desired, to effect the desired change in the height and/or the horizontal location of the tray assembly 15 relative to the supporting bar 11. Tightening the adjusting control knob 240 effects reverse rotation of the rocker levers 250 to clamp all three of the brake pads 272 sufficiently to maintain the desired height and horizontal location selected for the tray assembly 15.

First Variation of the Third Embodiment

With reference to FIG. 20, it will be observed that the arm assembly $14_{A1}$ employed in adjusting mechanism $10_H$ is virtually identical to arm assembly $14_A$ employed in adjusting mechanism $10_G$, except that the adjustment control knob 240 is operatively connected to the medial portion 258 of the rocker lever 250A in adjusting mechanism $10_H$ rather than to the end portion 255, as previously described in conjunction with adjusting mechanism $10_G$.

As such, the shaft portion 231 of the third draw bolt 239 passes through the aperture 269 provided in the vertically oriented mounting plate 268 presented by the tray assembly 15. The washer 237 optionally associated with the head portion 234 of the draw bolt 239 engages the rear face 270 of the mounting plate 268. The shaft portion 231 of the draw bolt 239 also extends through the center aperture 271 of the brake pad 272A that is interposed between the exterior face 273 on the mounting plate 268 and the opposed face 274 on one side of the base portion 246 of the housing 245A. The bore 275A—which aligns with the connecting bore 259 in the end cross plate 252A on rocker lever 250A—extends through the base portion 246 and continues through the center wall 248 to open into the recess 276A that extends transversely across the bifurcated edge 278 of the center wall 248. As such, the threaded portion 230 of the draw bolt 239 can be secured to a flange nut 232C which is received within the bore 259 that penetrates the end cross plate 252A of rocker lever 250A in arm assembly $14_A$.

A thrust plate 290 is received within a transverse recess 276C that is formed by the removal of a portion of the bifurcated edge 278 in the medial portion of the center wall 248 of housing 245A. The thrust plate 290 is disposed to span the recess 276C and be supported from the longitudinally extending, laterally spaced boundary walls 249A and 249B. When the thrust plate 290 is so positioned in the housing 245A, a bore 292 that pierces the thrust plate 290 aligns with the connecting bore 260. A connecting bolt 293 extends through the connecting bore 260 in the central cross plate 253 and through the registered bore 292 in the thrust plate 290 as well as through a thrust washer 279 and through a bearing washer 280 to be operatively engaged by an adjustment control knob 240. Specifically, the shank portion 281 of the adjustment control knob 240 extends through an aperture $282_A$ in the cover cap $241_{A1}$ to engage the bearing washer 280. As such, the input location for the medial portion 258 of the rocker lever 250A employed in this variation of the third embodiment is now the central cross plate 253 rather than the end cross plate 252A.

In summary, whether the adjustment control knob 240 effects direct tightening, or loosening, of the tension in the draw bolt 239, one can, with that single control effect an adjustment of the tray assembly 15 about the pivotal axis 20. As soon as one reduces the tension applied to the bolt 293 by proper manipulation of the adjustment control knob 240 in mechanism $10_H$ the rocker lever 250A begins to float. This condition releases the tension in the third draw bolt 239 so that movement of the tray assembly 15 about the pivotal axis 220 is possible as soon as the frictional engagement of the brake pad 272A between the exterior face 273 on the mounting plate 268 and the opposed face 274 on the base portion 246 of the housing 245A is sufficiently reduced. Conversely, tightening of the knob 240 translates the rocker lever 250A to increase the tension in the third draw bolt 239, thereby securing the tray assembly 15 in the desired rotated position about pivotal axis 220.

As with the control $10_G$ one can, with the adjustment control knob 240 employed in control $10_H$ also effect an adjustment in the vertical height, and/or horizontal location, of the tray assembly 15 relative to the supporting bar 11. When the rocker arm 250A begins to float as a result of the release of the tension in the bolt 293, tension in the third draw bolt 239 is reduced, and the rocker lever 250A will be permitted to rotate clockwise about the connection of the bolt 293 with the central cross plate 253 which, in the variation of the third embodiment being described, is the fulcrum resulting from the engagement of the bolt 293 with the central cross plate 253. As in the third embodiment, counterclockwise movement of rocker lever 250A permits the rocker lever 250B in arm assembly $14_B$ to rotate counterclockwise about its reaction location, which is the engagement of the pivot point 265 on rocker lever 250B with the fulcrum 266 in the housing 245B in arm assembly 14$_B$.

The aforesaid rocking movements of the levers 250 reduce the frictional clamping action against all three of the brake pads 272 such that the arm assembly 14$_B$ can articulate about axis 221 and the arm assembly 14$_A$ can articulate about axis 222, as desired, to effect the desired change in the height and/or horizontal location of the tray assembly 15 relative to the supporting bar 11. Tightening the adjustment control nut 240 translates the rocker lever 250A to preclude the float and thereby effect reverse rotation of the rocker levers 250 to clamp the brake pads 272 sufficiently to maintain the desired height and horizontal location selected for the tray assembly 15.

Second Variation of the Third Embodiment

An adjusting mechanism 10$_I$ which constitutes a further variation of mechanisms 10$_G$ and 10$_H$ is shown in FIGS. 21 through 23. The adjusting mechanism 10$_I$ is, in fact, the application of adjustment mechanism 10$_B$ to adjustment mechanism 10$_G$. Specifically, the adjusting mechanism 10$_I$ utilizes multiple arm assemblies 14, as in adjusting mechanisms 10$_G$ and 10$_H$. However, the adjusting mechanism 10$_I$ is operated by a double acting control lever 300 that is more closely akin to the arrangement in adjusting mechanism 10$_B$ rather than the adjustment control knob 240 employed in adjustment mechanisms 10$_G$ or 10$_H$.

The double acting control lever 300 may be captured within spaced notches 301A and 301B in the laterally spaced web walls 302A and 302B of the support frame 141$_A$ to which the tray surface member 142 is mounted to complete the tray assembly 15. A pair of finger-actuated control handles 304A and 304B are secured to the opposite ends of the double acting control lever 300.

The control lever 300 may, if desired, be perfectly straight, and the control handles 304 may be of such dimensions that they will serve to retain the control lever 300 substantially in place within the laterally spaced notches 301. Some longitudinal displacement of the control lever 300 will occur, depending upon the difference between the longitudinal spacing of the handles 304 and the longitudinal spacing of the web walls 302 engaged by the handles 304. A few inches of displacement may be tolerated, but should one wish to minimize such displacement of the control lever 300, the medial portion of the lever 300 may be provided with an offset 305 which loosely embraces one end 306 of a pivot pin 308, the other end 309 of which is pivotally received within a cup-shaped bearing 310 provided in the support frame 141$_A$ that generally falls within the vertical plane of the third draw bolt 239.

A compression spring 311 circumscribes the third draw bolt 239 and extends between a pair of longitudinally spaced centering washers 312A and 312B. Each centering washer 312 has an annular sleeve portion 313 that is disposed concentrically of the head portion 234 on the draw bolt 239 to slide longitudinally therealong with relatively little lateral movement. A rim portion 314 extends radially outwardly from one end of the sleeve portion 313, and a follower flange 315 extends radially inwardly from the other end of the sleeve portion 313. The follower flange 315 slidably engages the shaft portion 231 of the draw bolt 239. As best seen in FIG. 22, the axial extent of the sleeve portion 313 on at least the centering washer 312A is preferably equal to the length of the head portion 234 so that when the follower flange 315 engages the shoulder 233 on the head portion 234 of the draw bolt 239 the rim portion 314 will lie in approximately the same plane as the axially outermost extremity of the head portion 234.

The centering washer 312B is disposed such that the rim portion 314 engages the rear face 270 on the mounting plate 268, which is a component of the support frame 141$_A$. The compression spring 311 extends between the rim portions 314 of the spaced centering washers 312A and 312B, and as a result, the biasing action of the spring 311 serves to effect a damping action against all three brake pads 272 in exactly the same manner as occurs when the adjustment knob 240 is tightened in adjusting mechanism 10$_G$.

In order for the spring to be able to effect that result, the threaded end portion 230 of the draw bolt 239 must be secured to the flange nut 232C that is received within the connecting bore 259 in the end cross plate 252A of the rocker lever 250A in arm assembly 14$_{A2}$.

The arm assembly 14$_B$ is operatively attached to arm assembly 14$_{A2}$ by the draw bolt 238 in the same manner as the other versions of the third embodiment previously described.

In order for the control lever 300 to compress the spring 311, the control lever 300 must be able to pivot on either the end wall 316 of notch 301A or the end wall 316 of notch 301B. That is, if one applies finger pressure to handle 304A so as to rotate the control lever 300 about the end wall 316 of notch 301B in the direction of the arrow in FIG. 21, the medial portion (as represented by offset 305) of the control lever 300 will engage the end portion 306 of the pivot pin 308 such that the other end 309 of the pivot pin 308 will pivot within the cup-shaped bearing 310 to permit the generally medial portion 318 of the pivot pin 308 to compress the spring 311 and drive against the axial end of the head portion 234 on the draw bolt 239. When the spring 311 is compressed and the draw bolt 239 is translated to the right (as depicted in FIG. 23) by the action of the pivot pin 308 in response to actuation by the control lever 300, the tensile stress within the draw bolt 239 is released. The translation of draw bolt 239 permits the rocker lever 250A in arm assembly 14$_{A1}$ to rotate clockwise about the engagement of the pivot point 265 with the fulcrum 266 in the housing 245A.

Clockwise rotation of rocker lever 250A permits the rocker lever 250B in arm assembly 14$_B$ to rotate counterclockwise, as previously explained in detail in conjunction with adjusting mechanism 10$_G$, so that one can adjust the pivotal position, the height and/or the horizontal position of the tray assembly 15 above the support bar 11, as desired. Merely releasing the finger pressure applied against the handle 304A will permit the compression spring 311 to expand between the centering washers 312 and apply a tensile force to the draw bolt 239, thereby reimposing the clamping action against all three brake pads 272 in the same manner as occurs in adjusting mechanism 10$_G$ when the adjustment control knob 240 is tightened. Thus, one may adjust the pivotal disposition, the height and/or the horizontal position of the tray assembly 15 above the support bar 11 merely by single handed actuation of the control lever 300.

It should also be appreciated that should one actuate the control handle 304B, the control lever 300 will pivot about the end wall 316 of notch 301A such that the medial portion 318 of the control lever 300 will engage the end portion 306 of the pivot pin 308 to cause the other end 309 of the pivot pin 308 to pivot within the cup-shaped bearing 310. Thus, in the same manner as heretofore described in conjunction with the application of finger pressure to handle 304A the generally medial portion 318 of the pivot pin 308 will compress the spring 311 and drive against the axial end of the head portion 234 on the draw bolt 239 to permit selection of the desired rotational disposition and height of the tray assembly 15 above the support arm 11. The clamping action necessary to secure the tray assembly 15 in the desired location will likewise be accomplished simply be releasing the finger pressure from the control handle 304B.

Summation

One skilled in the art will appreciate, at this point, that many variations, not all of which have been explicitly described, are possible. For example, the single lever 140 described for the structural variation 10$_B$ depicted in FIG. 8 could be used with the fixed vertical support assembly 12$_B$ described for the structural variation 10$_F$ shown in FIG. 13.

Figure 2:
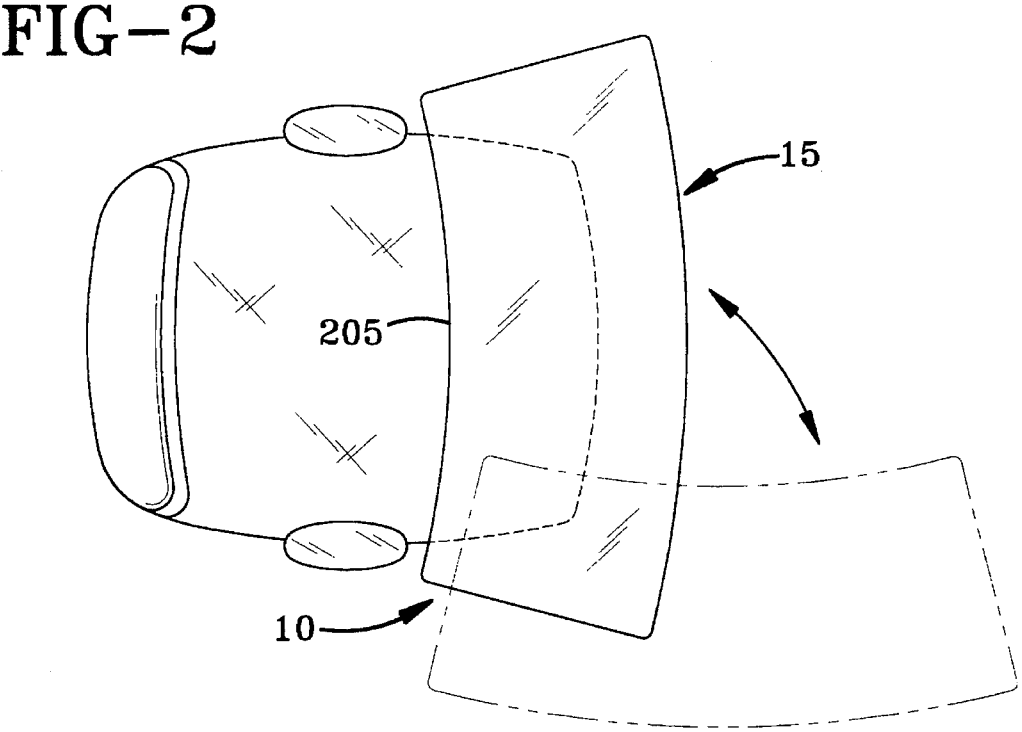
FIG. 2 is a top plan view of the chair depicted in FIG. 1 and with the tray assembly depicted in the working position, in solid line, and in the access position by which to facilitate entry and exit of the operator from the chair, in chain line.

As was previously mentioned, the mounting bar 11 may be secured to the underside 17 of the chair seating frame 18 for either right hand or left hand usage of the chair. Inasmuch as the tray surface member 142 may be provided with a generally arcuate recess 205 (FIGS. 2 and 8) along at least one edge thereof which provides a "wrap around" affect for the computer operator, changing from right to left hand usage will require that the tray surface member 142 be removed from the tray frame 141 and rotated horizontally through 180 degrees to locate the arcuate recess 205 properly when the adjustment mechanism 10 is changed from one to the other side of the chair. This result can be readily accomplished by securing the tray surface member 142 to the tray frame 141 by four fasteners 206 in the nature of screws which extend through the holes 207A, 207B, 207C and 207D in the tray frame 141 operatively to engage the under surface 147 on the tray surface member 142.

While only three preferred embodiments, and several variations of each embodiment, of my present invention are disclosed, it is to be clearly understood that the same is susceptible to numerous further changes apparent to one skilled in the art. Therefore, the scope of the present invention is not to be limited to the details shown and described but is intended to include all changes and modifications which come within the scope of the appended claims.

As should now be apparent, the present invention not only teaches that an adjusting mechanism embodying the concepts of the present invention can be readily supplied for use in conjunction with a chair-mounted computer input device but also that the other objects of the invention can likewise be accomplished.

We claim:

1. An adjusting assembly for mounting a supporting tray assembly to a chair, said adjusting assembly comprising:

a substantially horizontally disposed mounting bar having distal and proximal end portions;

said proximal end portion of said mounting bar supported from a chair; at least two arm assemblies;

each said arm assembly having a housing and first and second end portions;

one end portion of one arm assembly supported from said distal end portion of said mounting bar for articulation about a first articulating axis;

a tray assembly pivotally supported from one end portion of another arm assembly for movement about a pivotal axis;

the other end portions of said arm assemblies pivotally connected for relative articulation about an intermediate axis;

a rocker lever received within each said housing; each said rocker lever having first and second ends and an apex located medially of said first and second ends:

said rocker levers each having an input connector location, a reaction connector location and an output connector location spaced along said rocker lever and selectively located at said first and second ends and at said apex;

said output connector location of one said rocker lever being connected through said intermediate axis to said input connector location of the other said rocker lever: and, means operatively interacting with at least one of said connector locations to control the adjustment of said assembly.

2. An adjusting assembly for mounting a supporting tray assembly to a chair, said adjusting assembly comprising:

a substantially horizontally disposed mounting bar having distal and proximal end portions;

said proximal end portion supported from a chair;

at least two arm assemblies;

each said arm assembly having a housing and first and second end portions;

one end portion of one arm assembly supported from said distal end portion of said mounting bar for articulation about a first articulating axis;

a tray assembly pivotally supported from one end portion of another arm assembly for movement about a pivotal axis;

the other end portions of said arm assemblies pivotally connected for relative articulation about an intermediate axis;

a rocker lever received within each said housing;

said rocker levers each having first and second ends and an apex located medially of said first and second ends:

each of said rocker levers, also having at least one input connector location, at least one reaction, connector location and an output connector location spaced selectively along said rocker lever at said first and second ends and at said apex:

said reaction connector location on one said rocker lever located at said apex and serving as a pivot point and being located medially of one said input connector location and said output collector location:

first draw means disposed concentrically with said first articulating axis and operatively secured between said distal end of said mounting bar and one connector location on said rocker lever received within the arm assembly mounted to articulate about said first articulating axis:

second draw means disposed concentrically with said pivotal axis and operatively secured between said supporting tray assembly and one connector location on said rocker lever received within the arm assembly from which said tray assembly is mounted for movement about said pivotal axis:

intermediate, draw means disposed concentrically with said intermediate articulating axis and operatively secured between one said input connector location on the said rocker lever in one arm assembly and the output location on the said rocker lever received within the other arm assembly mounted to articulate about said intermediate axis: and adjustment control means operatively connected to at least one said draw means to adjust the assembly by simultaneously securing:

the selected articulating position of said arm assemblies about said first articulating axis;

the selected pivotal position of said tray assembly about said pivotal axis; and, the selected pivotal articulation of said arm assemblies with respect to each other about said intermediate articulating axis; and, said adjustment control means thereby securing the desired pivotal disposition of said tray assembly as well as the selected distance between said mounting bar and said tray assembly by operatively interacting with at least one of said input connector locations.

3. An adjusting assembly for mounting a supporting tray assembly to a chair, as set forth in claim 2, wherein:

said is closer to the end of said rocker lever serving as said output connector location than it is to the other end of said rocker lever.

4. An adjusting assembly for mounting a supporting tray assembly to a chair, as set forth in claim 4, wherein said adjustment control means further comprises:

knob means operatively attached to one of said connector locations such that actuation of said knob means operatively displaces said rocker lever in each said arm assembly and thereby clamps said tray assembly in its selected disposition about said pivotal axis as well as the height and horizontal position of said tray assembly relative to said first articulating axis.

5. An adjusting assembly for mounting a supporting tray assembly to a chair, as set forth in claim 4, wherein;

said knob means is operatively attached to said connector location on said rocker lever in only one of said arm assemblies.

6. An adjusting assembly for mounting a supporting tray assembly to a chair, as set forth in claim 5, wherein:

said knob means is operatively attached to said connector location that is disposed at said apex medially of the connector locations at the ends of said rocker lever.

7. An adjusting assembly for mounting a supporting tray assembly to a chair, as set forth in claim 5, wherein:

said knob means is operatively attached to said connector location that is disposed in proximity to one end portion of said rocker lever.

8. An adjusting assembly for mounting a supporting tray assembly to a chair, as set forth in claim 4, further comprising:

a frictional brake means operatively associated with each said housing and being disposed substantially circumferentially about each said draw means associated with that housing;

said housings on the successive arm assemblies being disposed to interpose said frictional brake means in opposed juxtaposition with not only the other said arm assemblies but also said tray assembly and said mounting bar.

9. An adjusting assembly for mounting a supporting tray assembly to a chair, said adjusting assembly comprising:

a substantially horizontally disposed mounting bar having distal and proximal end portions:

said proximal end portion of said mounting bar supported from a chair:

at least two arm assemblies:

each said arm assembly having a housing and first and second end portions;

one end portion of one arm assembly supported from a chair for articulation about a first articulating axis:

a tray assembly pivotally supported from one end portion of another arm assembly for movement about a pivotal axis;

the other end portions of said arm assemblies interconnected for relative articulation about an intermediate axis:

a housing;

a fulcrum means presented from said housing;

rocker lever means in the nature of a first class lever having an input connector location, a reaction connector location and an output connector location;

said reaction connector location disposed between said input connector location and said output reaction location;

said rocker lever means being received within said housing with said reaction connector location engaging said fulcrum;

first draw means disposed concentrically with said first articulating axis and operatively secured between said distal end of said mounting bar and said output connector location on said rocker lever received within the arm assembly mounted to articulate about said first articulating axis;

second draw means disposed concentrically with said pivotal axis and operatively secured between said supporting tray assembly and one said input connector location on said rocker lever received within the arm assembly from which said tray assembly is mounted for movement about said pivotal axis;

intermediate draw means disposed concentrically with said intermediate articulating axis and operatively secured between said output connector location on one of said rocker levers and said input connector location on the other of said rocker levers received within the arm assemblies mounted to articulate about said intermediate articulating axis; and, means operatively interacting with one of said draw means to control the adjustment of the assembly.

10. An adjusting assembly for mounting a supporting tray assembly to a chair, as set forth in claim 1, wherein:

said pivot point is located closer to said output connector location than it is to said input connector location.

11. An adjusting assembly for mounting a supporting tray assembly to a chair, as set forth in claim 1, wherein:

said apex is located further from that end portion to which said adjustment control means operatively interacts than it is to the other said end portion on said rocker lever.

12. An adjusting assembly for mounting a supporting tray assembly to a chair, as set forth in claim 11, further comprising:

a brake surface operatively associated with each said housing and being disposed substantially circumferentially about each said draw means associated with that housing;

said housings on the successive arm assemblies being disposed to interpose said brake surfaces in opposed juxtaposition with not only the other said arm assemblies but also said tray assembly and said stanchion.

13. An adjusting assembly for mounting a supporting tray assembly to a chair, as set forth in claim 12, further comprising:

a brake pad disposed between each said brake surface.

14. An adjusting assembly for mounting a supporting tray assembly to a chair, as set forth in claim 1, wherein said adjustment control means further comprises:

knob means operatively attached to one of said draw means such that actuation of said knob means displaces said draw means to which it is operatively attached selectively to pivot said rocker lever in each said arm assembly and thereby clamp said tray assembly in its selected disposition about said pivotal axis and the height of said tray assembly relative to said first articulating axis.

15. An adjusting assembly for mounting a supporting tray assembly to a chair, as set forth in claim 1, wherein said adjustment control means further comprises:

a release actuator means operatively engaging said second draw means;

spring means to position said release actuator means such that said second draw means frictionally secures said tray assembly to the housing of said arm assembly that is mounted for movement about said pivotal axis;

a lever means to manually move said release actuator means operatively to overcome said spring means and thereby not only to release said second draw means to permit rotation of said tray assembly about said pivotal axis but also to release said first draw means and any said intermediate draw means to permit selected elevational movement of said tray assembly with respect to said first articulating axis.

16. An adjusting assembly for mounting a supporting tray assembly to a chair, as set forth in claim 15, wherein said release actuator means comprises:

a recess provided in said tray assembly;

a pin received within said recess;

said lever means tilting said pin within said recess to interact with said spring means.

* * * * *

UNITED STATES PATENT AND TRADEMARK OFFICE
CERTIFICATE OF CORRECTION

PATENT NO. : 5,476,304

DATED : December 19, 1995

INVENTOR(S) : Barron J. Gulliver and Clarence G. Machlan

It is certified that error appears in the above-identified patent and that said Letters Patent is hereby corrected as shown below:

Column 10, line 57, "10 0A and 10 0B" should be --100A and 100B--

Column 14, line 2, "1195" should be --195--

Column 17, line 16, "15resents" should be --presents--

Column 20, line 39, axis "20" should be axis --220--

Claim 2 -- Column 24, line 38, delete the comma between "levers" and "also"; line 39, delete the comma between "reaction" and "connection"

Claim 3 -- Column 25, line 17, insert --apex-- between "said" and "is closer"

Claim 10 -- Column 26, line 44, "1" should be --9--

Claim 11 -- Column 26, line 49, "1" should be --9--

Claim 14 -- Column 27, line 3, "1" should be --9--

Claim 15 -- Column 27, line 14, "1" should be --9--

Signed and Sealed this

Eighteenth Day of June, 1996

*Attest:*

BRUCE LEHMAN

*Attesting Officer*     *Commissioner of Patents and Trademarks*